(12) United States Patent
Fin et al.

(10) Patent No.: US 9,560,930 B2
(45) Date of Patent: Feb. 7, 2017

(54) BREWING UNIT WITH A WATER HEATER

(75) Inventors: Giuseppe Fin, Meolo (IT); Massimo Baldo, Quinto di Treviso (IT); Marco Santini, Breda di Piave (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 428 days.

(21) Appl. No.: 14/131,437

(22) PCT Filed: Jul. 4, 2012

(86) PCT No.: PCT/IB2012/053402
§ 371 (c)(1),
(2), (4) Date: Jan. 13, 2014

(87) PCT Pub. No.: WO2013/008140
PCT Pub. Date: Jan. 17, 2013

(65) Prior Publication Data
US 2014/0150666 A1 Jun. 5, 2014

Related U.S. Application Data
(60) Provisional application No. 61/506,243, filed on Jul. 11, 2011.

(30) Foreign Application Priority Data
Jul. 8, 2011 (EP) .................................... 11173197

(51) Int. Cl.
| A47J 31/40 | (2006.01) |
| A47J 31/36 | (2006.01) |
| A47J 31/46 | (2006.01) |
| A47J 31/60 | (2006.01) |
| A47J 31/54 | (2006.01) |

(52) U.S. Cl.
CPC ............ *A47J 31/407* (2013.01); *A47J 31/3633* (2013.01); *A47J 31/3638* (2013.01); *A47J 31/3676* (2013.01); *A47J 31/46* (2013.01); *A47J 31/60* (2013.01); *A47J 31/542* (2013.01)

(58) Field of Classification Search
CPC ...... A47J 31/46; A47J 34/407; A47J 31/3633; A47J 31/3638; A47J 31/3676; A47J 31/60; A47J 31/542
USPC .............. 99/279, 280, 281, 283, 288, 289 R, 295,99/302 P
See application file for complete search history.

(56) References Cited

U.S. PATENT DOCUMENTS

| 4,724,752 A | 2/1988 | Aliesch et al. |
| 5,657,683 A | 8/1997 | Sandei et al. |
| 6,129,006 A | 10/2000 | Schmed |

(Continued)

FOREIGN PATENT DOCUMENTS

| DE | 2800232 A1 | 7/1978 |
| EP | 0931491 A1 | 7/1999 |

(Continued)

*Primary Examiner* — Thien S Tran

(57) ABSTRACT

A brewing unit includes a brewing chamber having at least two brewing chamber portions movable one with respect to the other, a water heater, a hot water duct for feeding hot water from the water heater to the brewing chamber, and a beverage dispensing duct from which a beverage is dispensed. The water heater has a cavity through which the beverage dispensing duct extends for connection to an outer beverage dispensing spout.

18 Claims, 17 Drawing Sheets

(56) References Cited

U.S. PATENT DOCUMENTS

| | | | |
|---|---|---|---|
| 6,459,854 B1 * | 10/2002 | Yoakim | A47J 31/545 |
| | | | 222/71 |
| 2002/0088348 A1 | 7/2002 | Cortese | |
| 2007/0012685 A1 * | 1/2007 | Gourand | A47J 31/542 |
| | | | 219/628 |
| 2009/0900779 | 1/2009 | Cortese | |
| 2011/0041696 A1 * | 2/2011 | Aemisegger | A47J 31/3623 |
| | | | 99/281 |
| 2011/0162530 A1 | 7/2011 | Castellani | |
| 2011/0293805 A1 * | 12/2011 | Perentes | A47J 31/22 |
| | | | 426/433 |

FOREIGN PATENT DOCUMENTS

| | | | | |
|---|---|---|---|---|
| IT | WO 2008014830 A1 * | 2/2008 | | A47J 31/3633 |
| WO | WO 2009130099 A1 * | 10/2009 | | A47J 31/3633 |
| WO | 2010021532 A1 | 2/2010 | | |

* cited by examiner

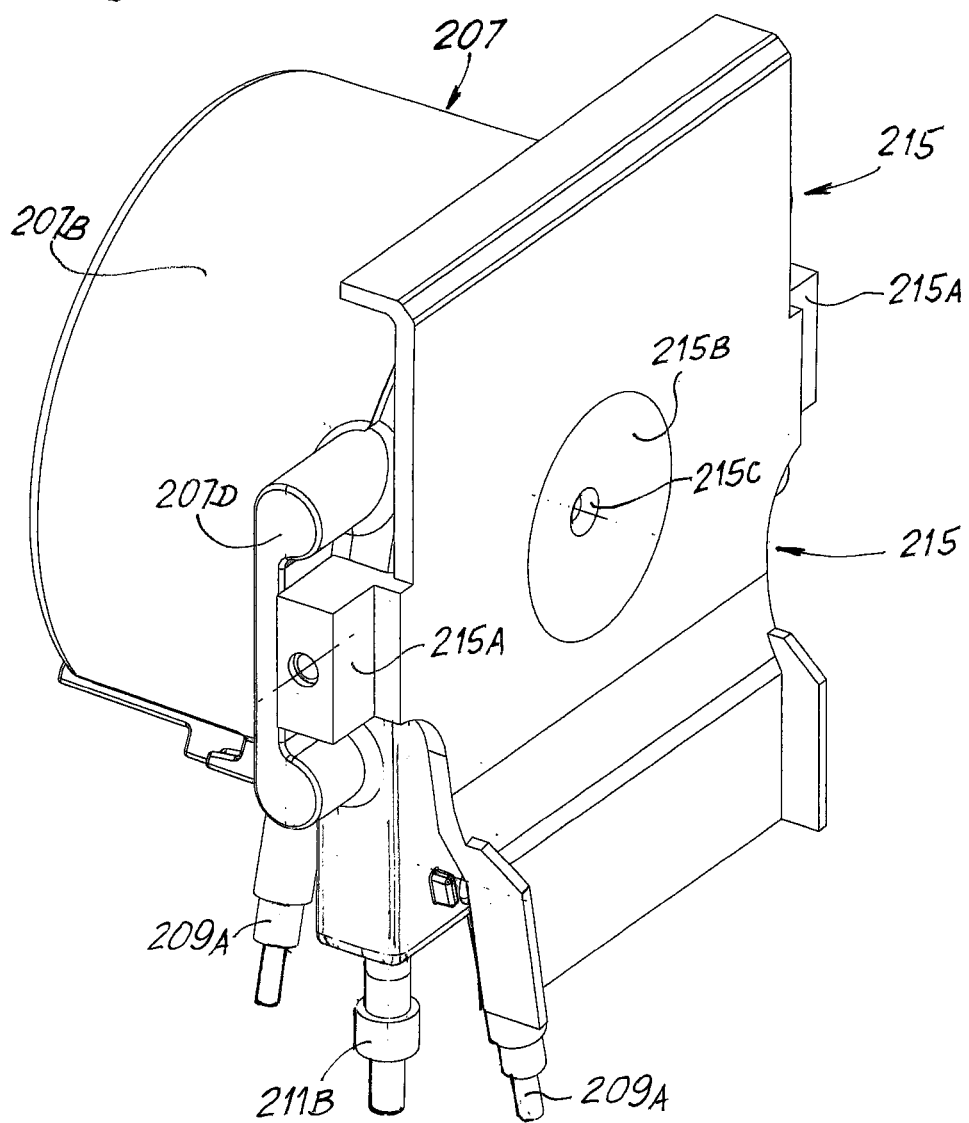

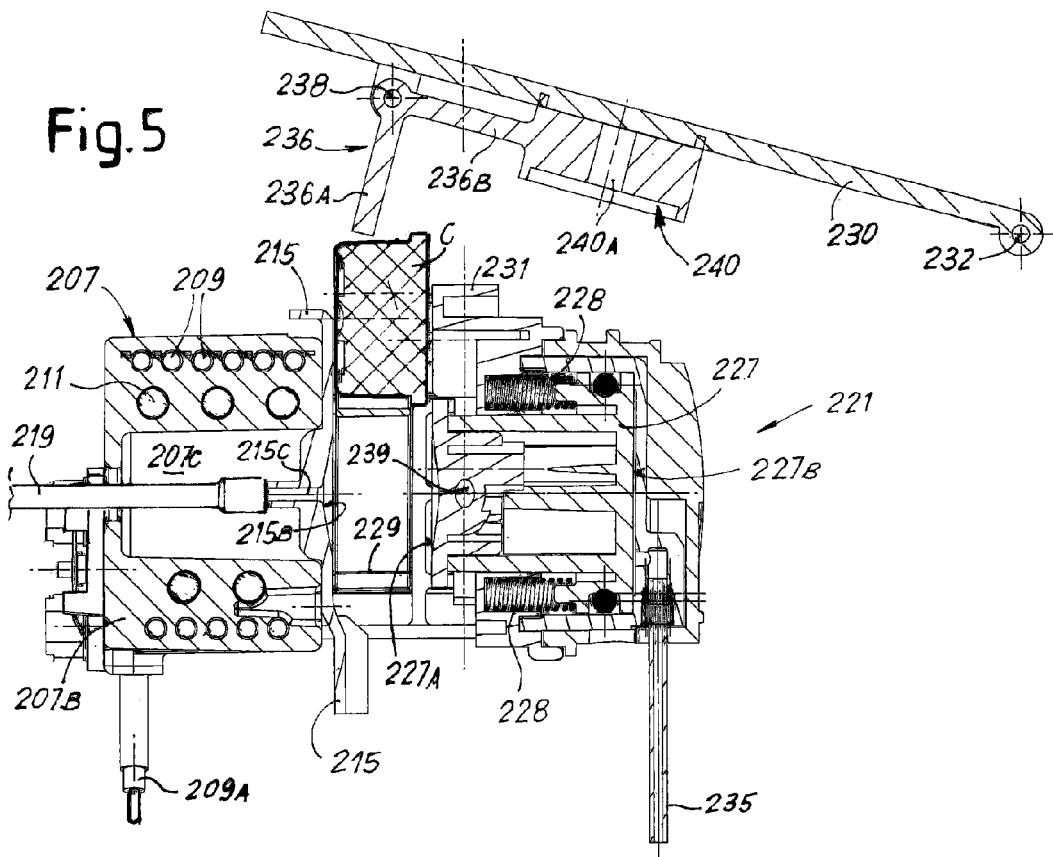
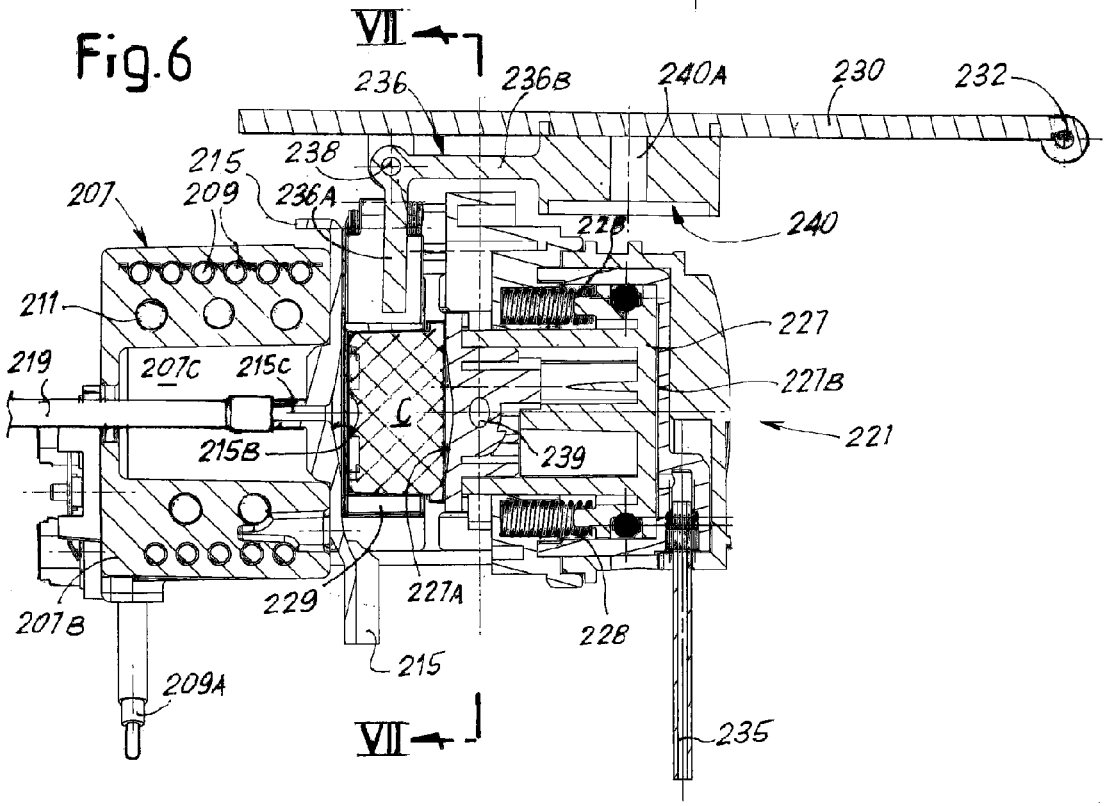

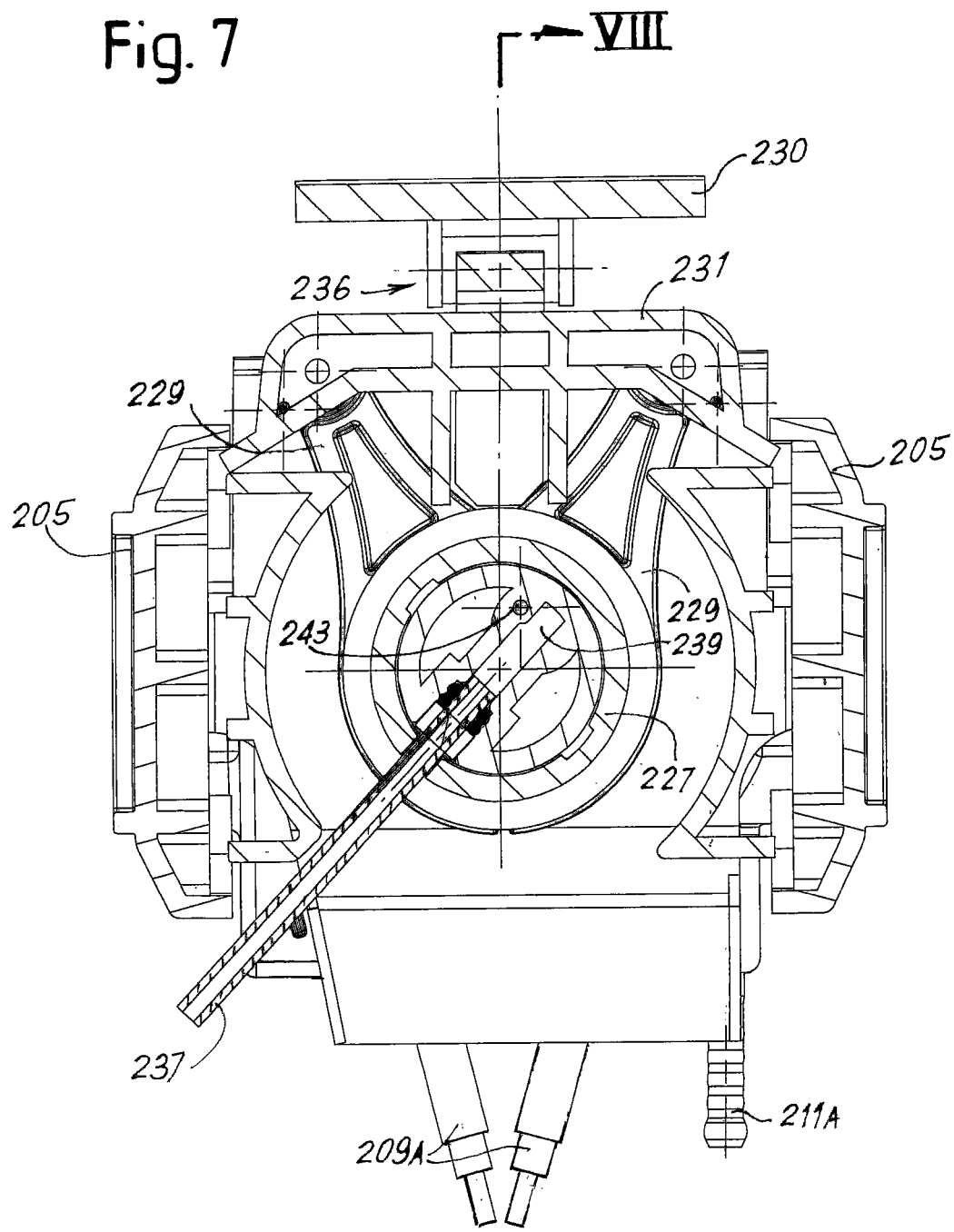

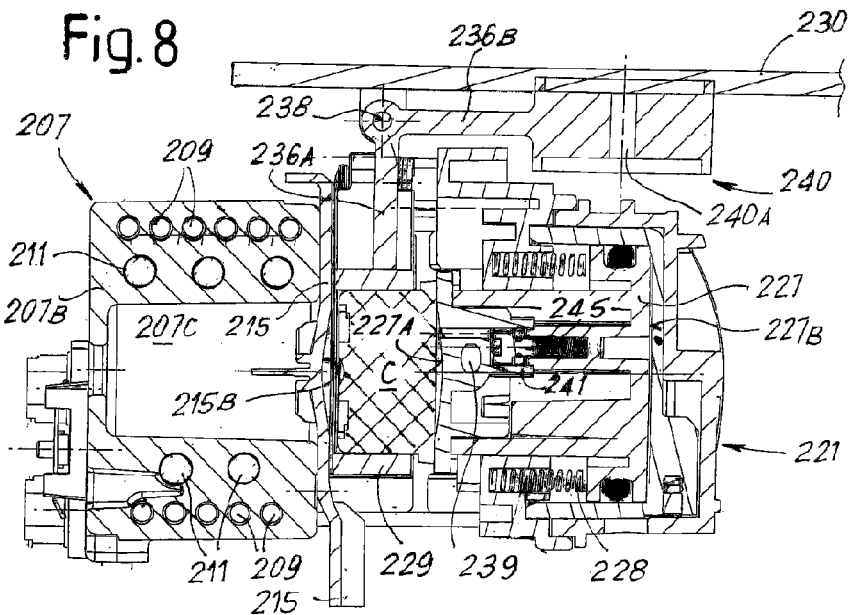
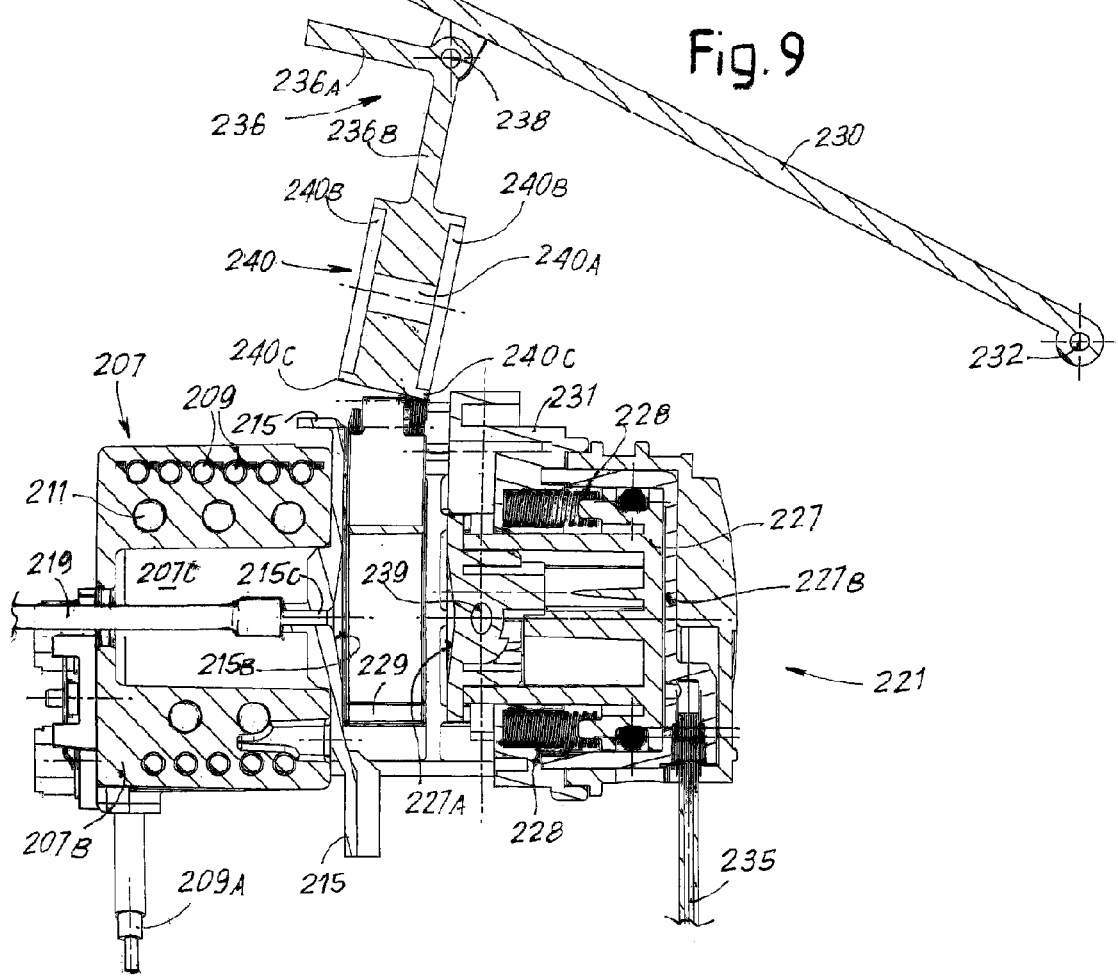

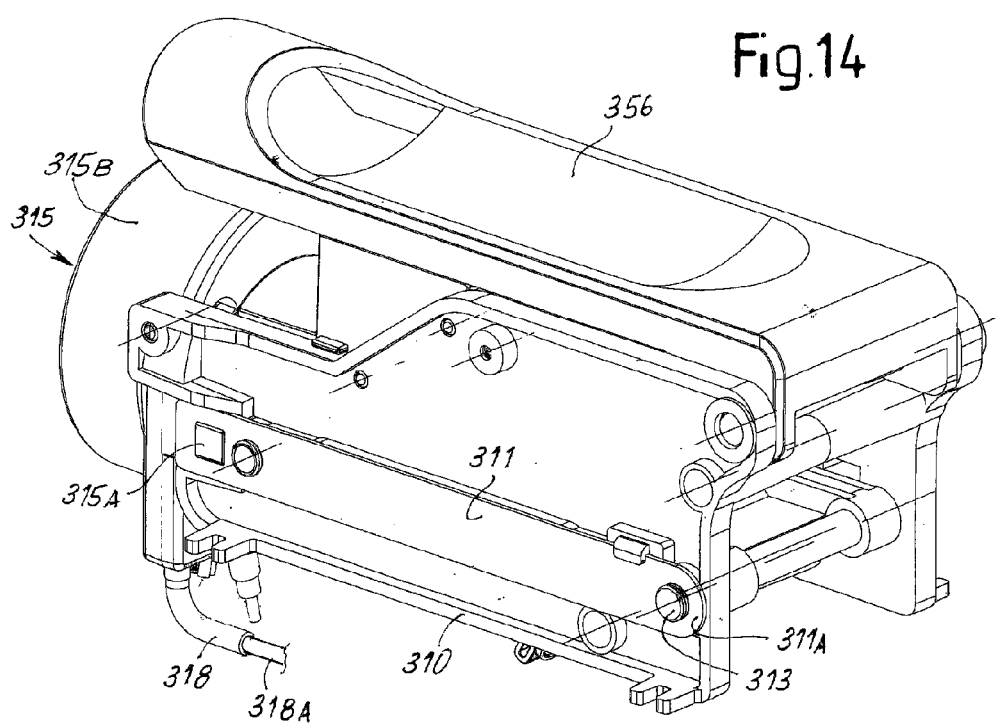
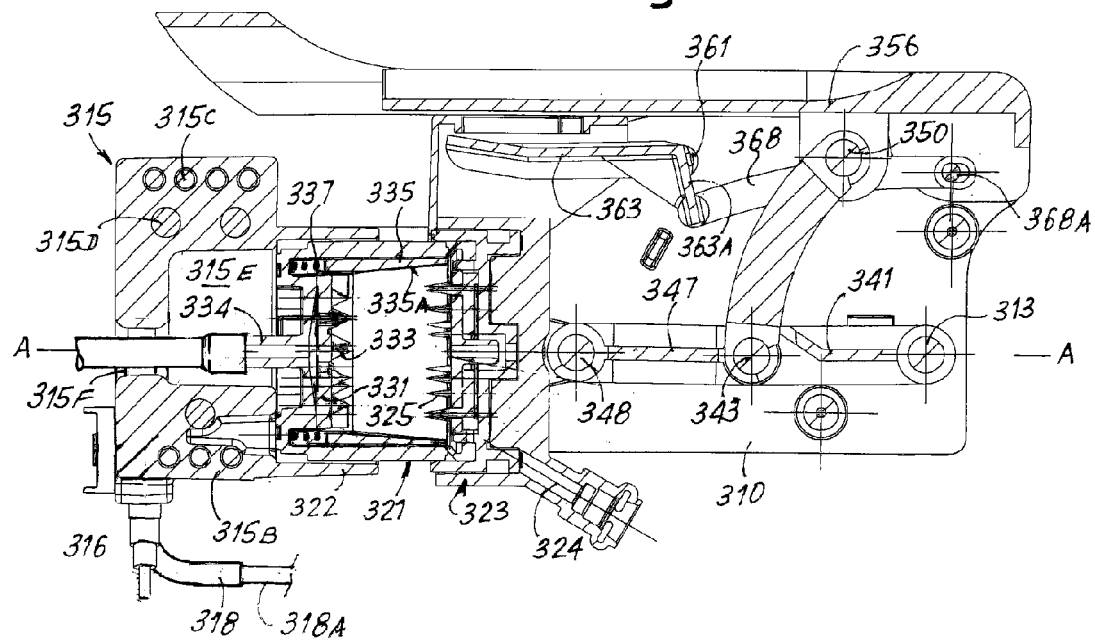

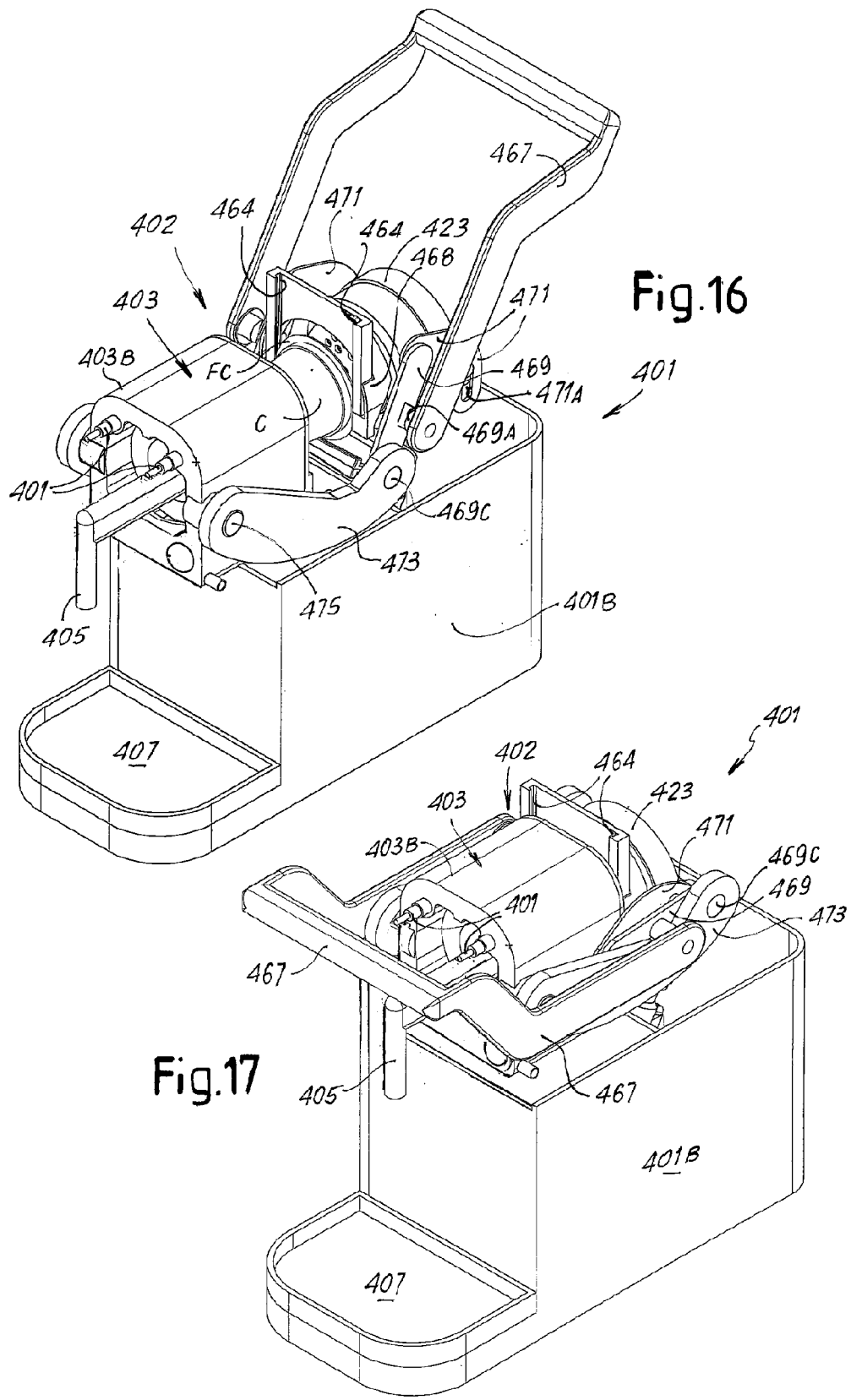

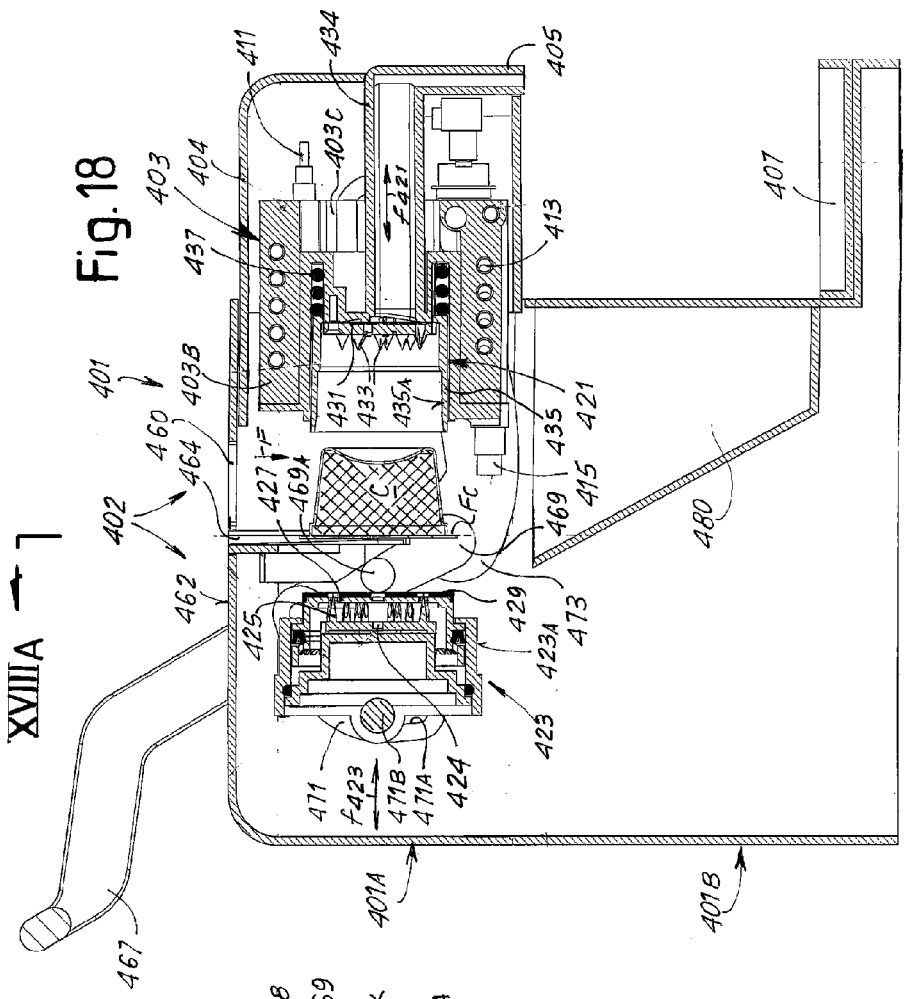

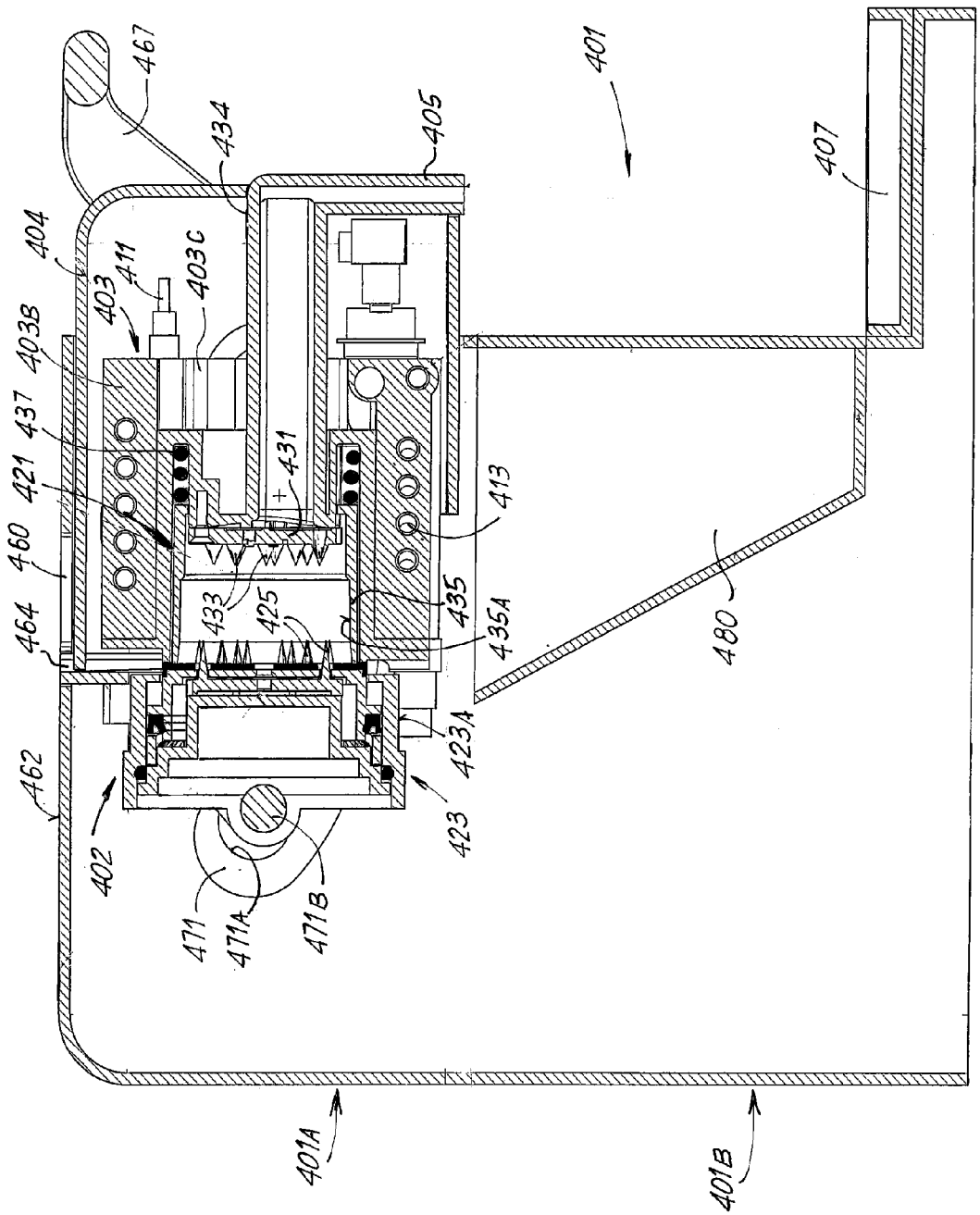

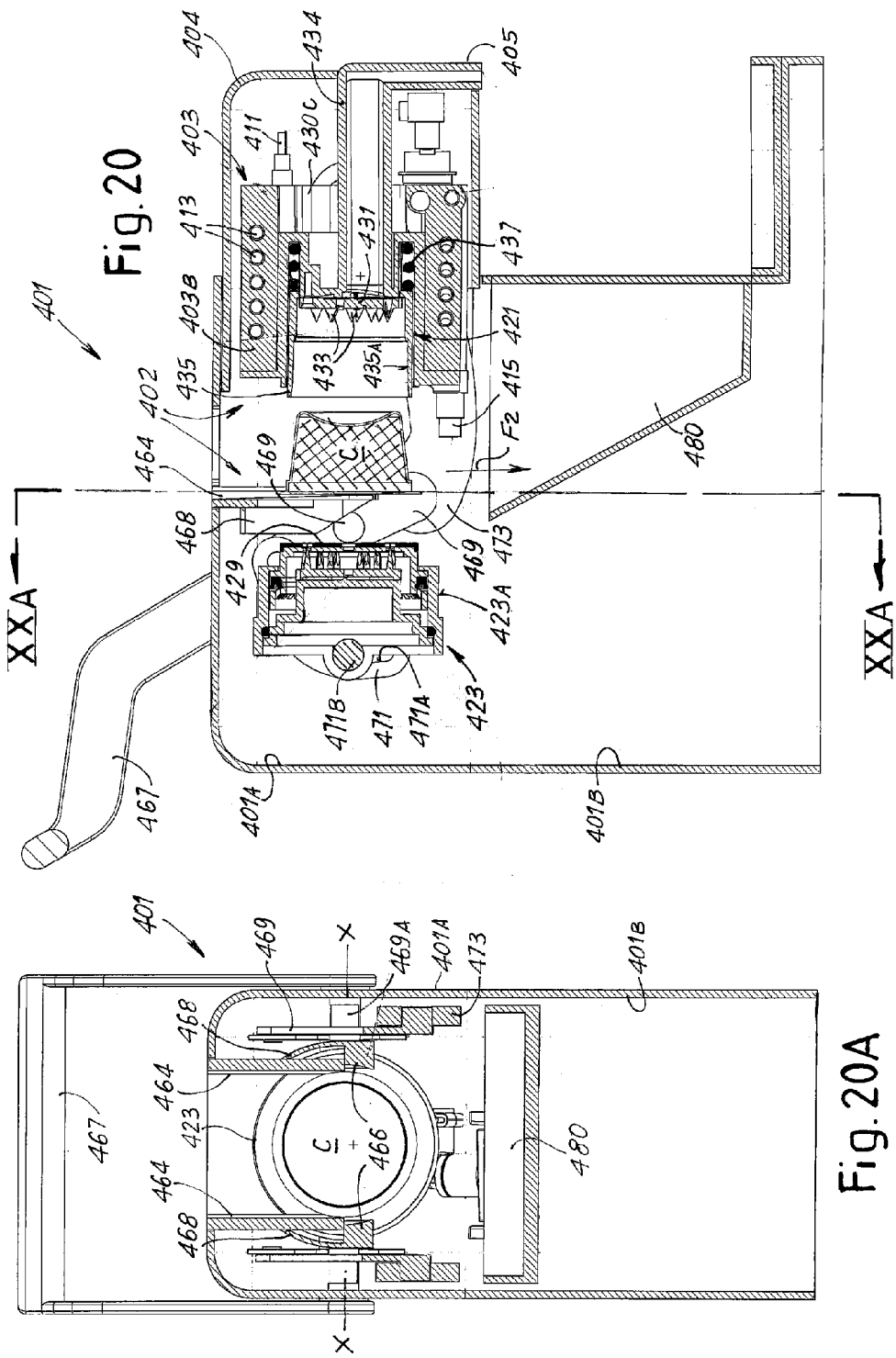

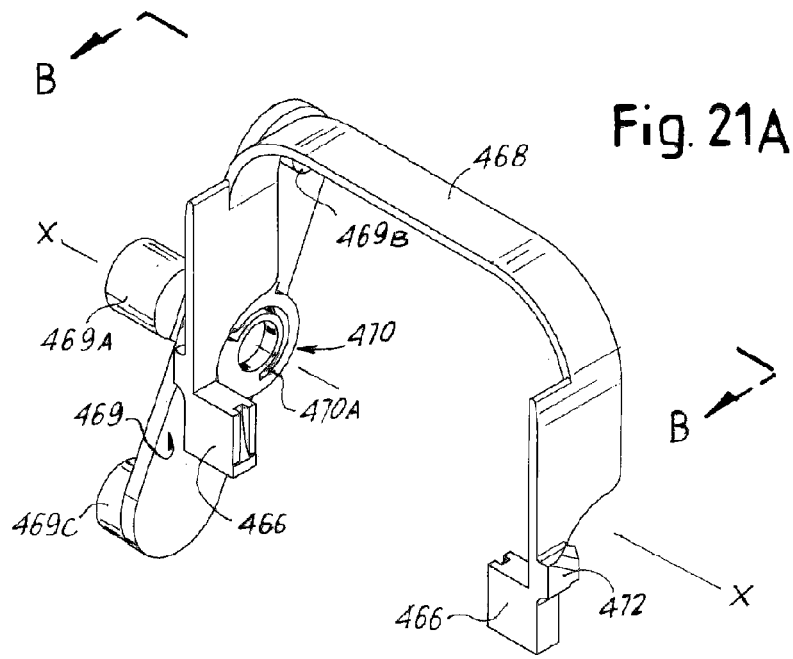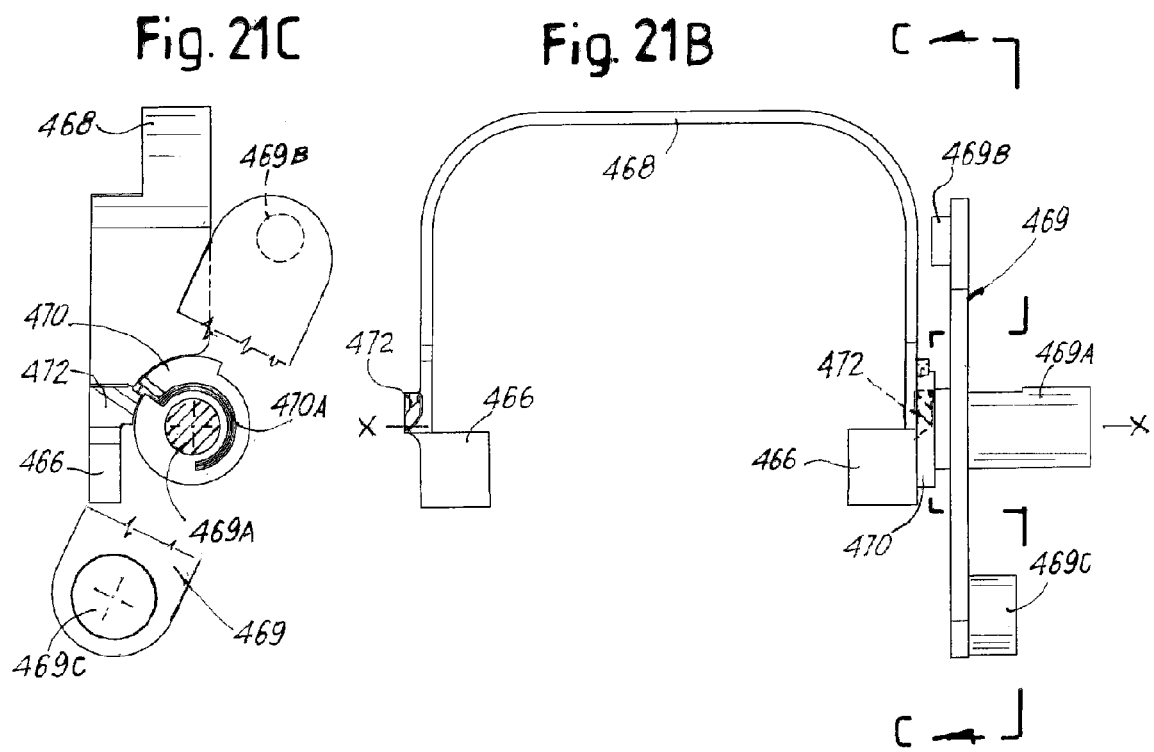

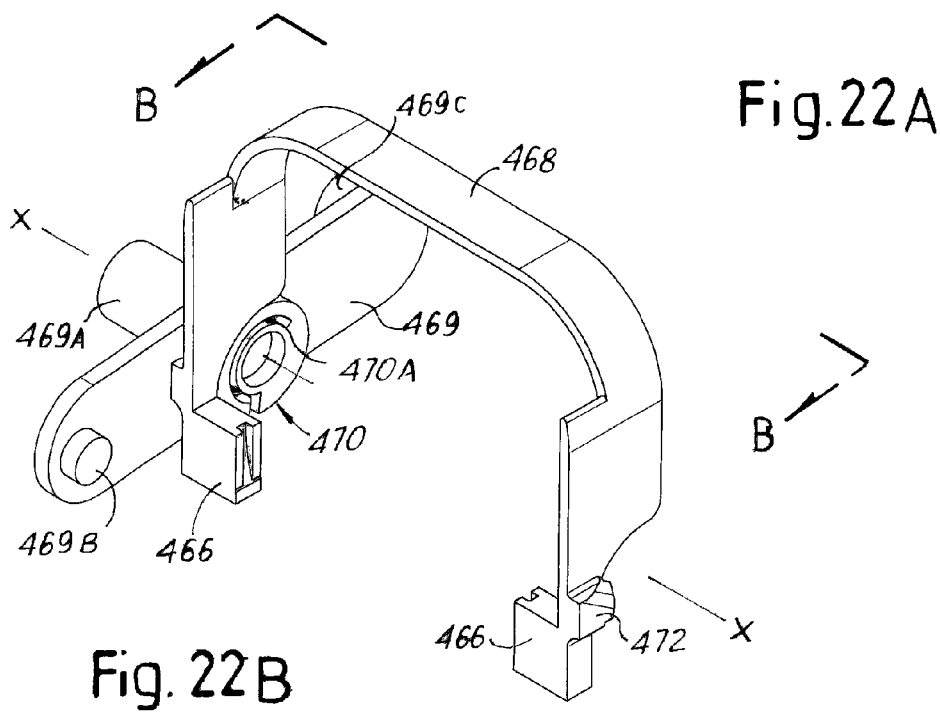
Fig. 22A
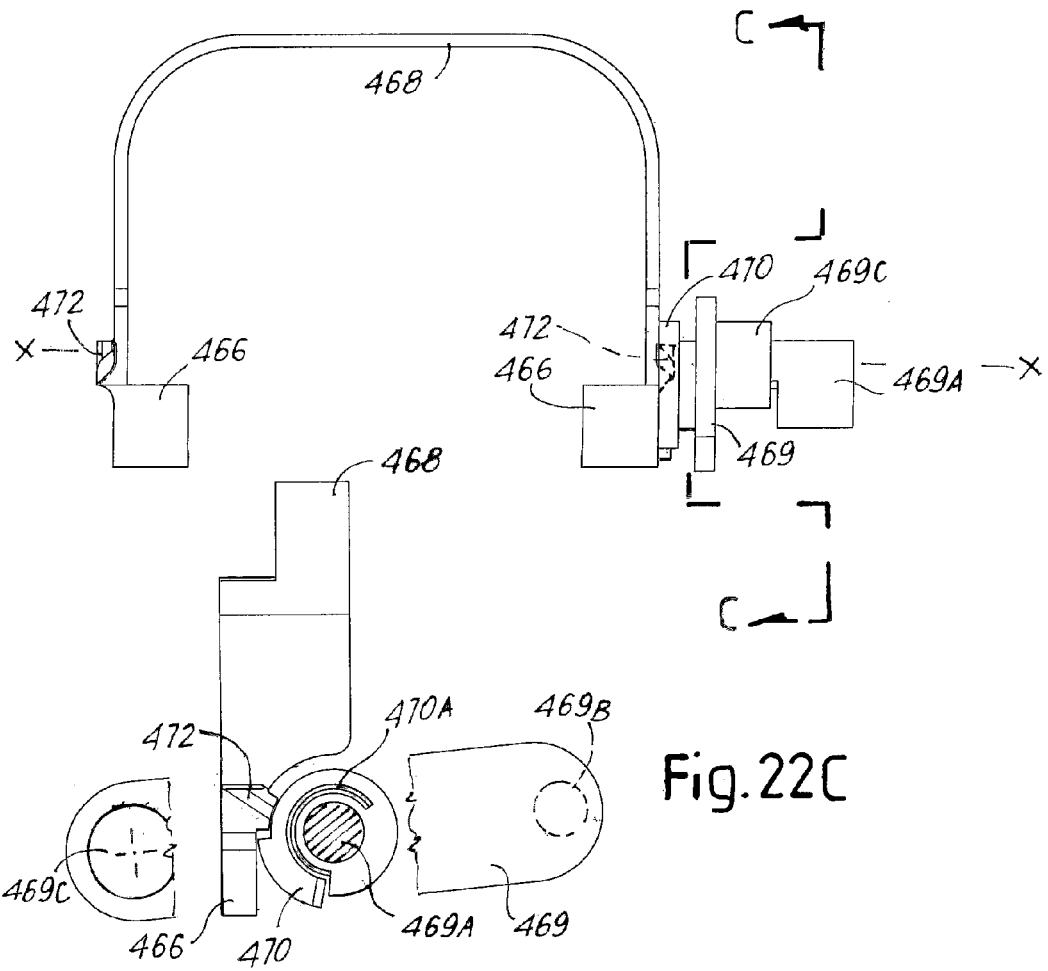
Fig. 22B
Fig. 22C

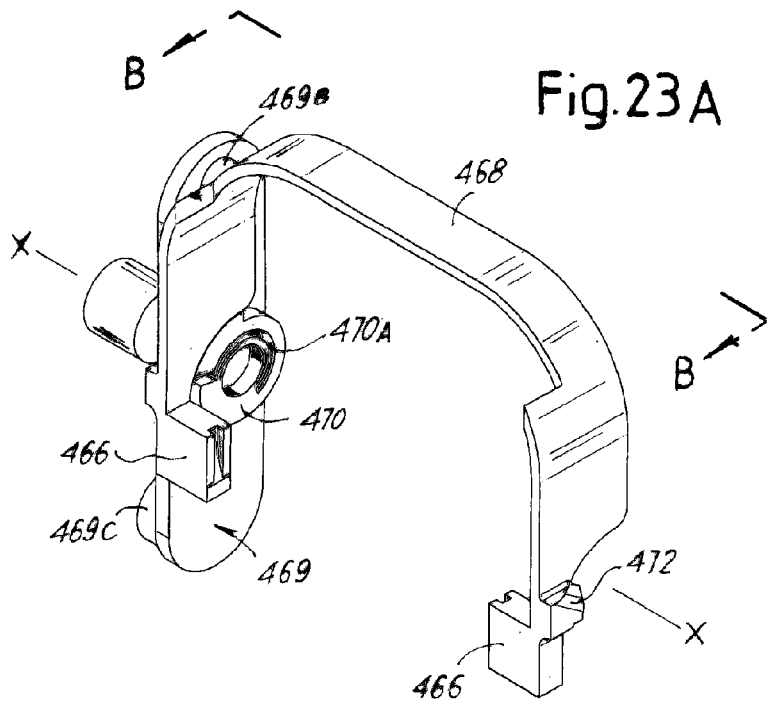
Fig.23A
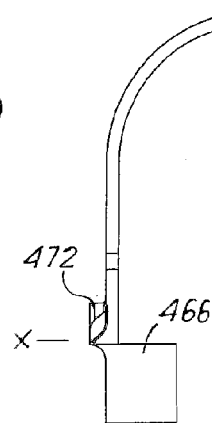
Fig.23C
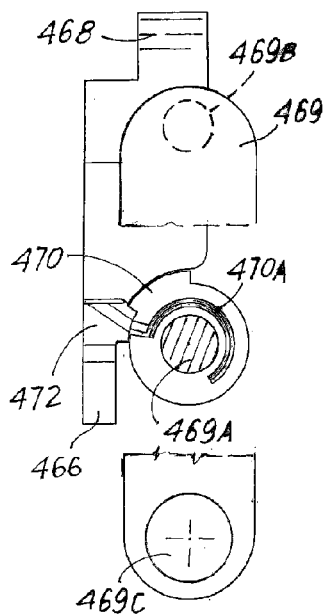
Fig.23B
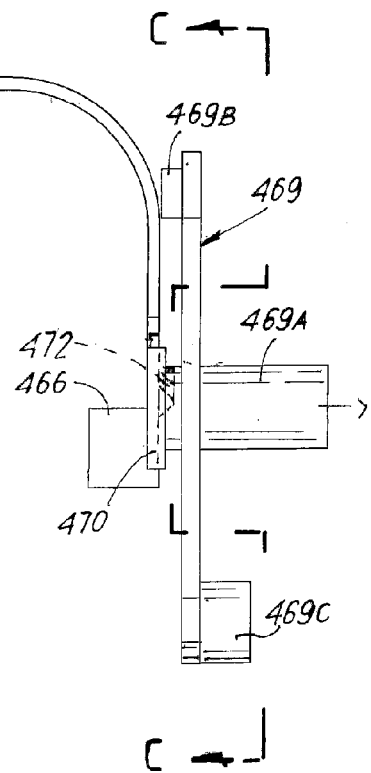

BREWING UNIT WITH A WATER HEATER

CROSS-REFERENCE TO PRIOR APPLICATIONS

This application is the U.S. National Phase application under 35 U.S.C. §371 of International Application No. PCT/IB2012/053402, filed on Jul. 4, 2012, which claims the benefit of U.S. Provisional Patent Application No. 61/506,243, filed Jul. 11, 2011 and European Patent Application No. 11173197.2, filed on Jul. 8, 2011. These applications are hereby incorporated by reference herein.

TECHNICAL FIELD

The present invention relates to a brewing unit for producing drinks such as coffee, from loose coffee powder or single-dose packagings, such as capsules or pods.

BACKGROUND ART

For producing hot drinks, such as for example coffee, tea, vegetable-based infusions and the like, single-dose packagings, in the form of so-called capsules, pods, cartridges or the like are often used. Here after the term "capsule" will be used to broadly designate such a single-dose packaging. It shall be understood that, unless specifically indicated, said term is to be understood as encompassing any kind of single-dose packaging suitable for preparing beverages or other edible products by extraction using hot and possibly pressurized water. A single-dose packaging can include sufficient ingredients to prepare more than just one portion of beverage, e.g. two portions.

Capsules usually contain the ingredients for producing the drink. Hot water is made to flow through the capsule at an adequate pressure to extract the flavours from the ingredients contained in the capsule. There are several types of devices for handling the capsules and for the infusion, which is the phase of extracting the flavours from the capsules through water passage.

Some coffee machines are designed for use of loose coffee powder or other loose products. In these machines a dosed quantity of loose product is charged in a brewing chamber. The chamber is closed in a water-tight manner and hot pressurized water is fed from a water heater through the product charged in the brewing chamber, to extract flavours from the ingredients.

U.S. Pat. No. 6,129,006 and EP-A-0931491 disclose a brewing unit specifically intended for brewing coffee from bulk coffee powder. This known brewing unit includes a brewing chamber and a water heater. The water heater is arranged near to the brewing chamber. The hot pressurized water produced by the water heater directly flows in the brewing chamber. The latter is in heat contact with the water heater such that power consumption is optimised. Arranging the water heater near the brewing chamber has the advantage of reducing heat dissipation from the heated water along the path from the water heater to the brewing chamber.

U.S. Pat. No. 5,657,683 discloses a hto beverage brewing apparatus wherein a brewing chamber is surrounded by a hot water reservoir containing a heating resistor arranged therein. The brewed beverage is dispensed by a pipe which extends across the water contained in said reservoir.

SUMMARY OF THE INVENTION

Especially in espresso coffee machines, the temperature of the dispensed beverage is a critical aspect. A portion of espresso coffee contains typically a small amount of beverage, which cools down quickly once it has been dispensed from the coffee spout. On the other hand, the beverage temperature is one of the essential feature characterizing a high quality espresso. Increasing the brewing water temperature is not a feasible approach to solve the above problem since too high a brewing water temperature would damage the coffee powder resulting in poor taste of the final beverage.

The above problem specially affects the first espresso coffee dispensed upon turning on the coffee machine or after a prolonged machine standby.

Similar problems can arise also in machines for preparing different kinds of beverages for human consumption using hot water flowing through a brewing unit.

The present invention relates to a brewing unit, which solves or at least alleviates the above mentioned problem. The invention also concerns a machine for producing beverages suitable for human consumption, including such a brewing unit.

According to the invention a brewing unit for the production of a beverage is provided, comprising: a brewing chamber comprising at least two brewing chamber portions movable one with respect to the other; a water heater; a hot water feeding duct for feeding hot water from said water heater in said brewing chamber; a beverage dispensing duct from which said beverage is dispensed. The water heater has a body, e.g. made of a suitably heat-conductive material, such as a aluminum or another heat-conductive metal. Preferably the body houses an electric resistor and a water heating duct. Heat generated by the electric resistor, when powered, heats the water flowing through the water heating duct by heat conduction through the material forming the body. The body of the water heater forms an empty cavity through which the beverage dispensing duct extends for connection to an outer beverage dispensing spout. Preferably the water heating duct is wound around the cavity forming one or more helical coils around said cavity and within said body. Also the electric resistor is preferably wound around the cavity, forming one or more coils. Heat generated by the electric resistor, therefore, on the one hand heats the water flowing through the water heating duct, and on the other heats the cavity through which the beverage dispensing duct extends. The beverage dispensing duct is therefore kept at a temperature higher than the ambient temperature thanks to heat dissipated by the water heater. Already the first beverage dispensed by the machine is sufficiently hot without the need for increasing the brewing water temperature in excess of a given threshold.

Within the context of the present description and enclosed claims, the term "brewing chamber" shall not be necessarily understood as being a sealingly closed chamber. Rather, as will become clear from the detailed description of some exemplary embodiments of the invention, the brewing chamber can also be formed by chamber portions which define a volume in which a capsule or cartridge is arranged and which is not per se sealed. The brewing chamber portions in this case retain the capsule and prevent bursting of the capsule when pressurized water flows through the capsule. However, the chamber portions surround the capsule without necessarily providing a waterproof seal around the capsule.

In some embodiments, the first brewing chamber portion and said second brewing chamber portion are movable between an open position, in which said two brewing chamber portions are distanced from one another for receiving an ingredient-containing package therebetween, and a closed brewing position. Preferably, the first brewing chamber portion and the second brewing chamber portions are movable one with respect to the other along a substantially horizontal direction and the ingredient-containing packages are introduced substantially vertically between the first and second brewing chamber portions, when the latter are in the open position.

In some embodiments at least one of the brewing chamber portions is in thermal contact with said water heater. This increases the thermal efficiency of the brewing unit and allows maintaining a suitable brewing temperature also after a long period of standby of the machine or at machine start up. In some embodiments the brewing chamber portion in thermal contact with said water heater comprises a recess for a capsule. An enhanced thermal efficiency is obtained thanks to the larger heat-exchange surface between the brewing chamber and the capsule Particularly high thermal efficiency is obtained if the brewing chamber portion in thermal contact with the water heater is at least partly arranged in a seat formed by a body of said water heater, said body containing a water heating duct and an electric resistor. In this way heat is directly exchanged by heat conduction between the electric resistor and the chamber portion. For example the brewing chamber can be formed by a part of a metallic mass, e.g. aluminium or an aluminium alloy, forming the body of the water heater.

In some embodiments the seat in which said portion of the brewing chamber is arranged can be in fluid connection with a through cavity extending along the body of the water heater, said beverage dispensing duct extending along said cavity. An arrangement is thus obtained wherein the water heater comprises a body in which at least one electric resistor and at least one water heating duct are embedded, and which forms a seat where the brewing chamber portion is arranged, for example an axial seat. The axial seat can extend along a part of the water heater body and extend to form a cavity open to the end of the water heater body opposite said seat, such that the beverage dispensing duct extends from the seat across the water heater to the exterior thereof, developing along the above mentioned cavity.

In some embodiments only one of said at least two chamber portions is movable with respect to a stationary supporting frame, for example. According to other exemplary embodiments, both said at least two chamber portions are movable with respect to a stationary supporting structure or the like. In some embodiments the brewing chamber can comprise more than two brewing chamber portions and one, two or more of them can be movable.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 4 shows a perspective view of the water heater removed from the brewing unit of FIGS. 2 and 3;

FIG. 5 shows a longitudinal cross-section of the brewing unit according to FIGS. 2 to 4 with the brewing chamber in the open position;

FIG. 6 shows a longitudinal cross-section of the brewing unit of FIGS. 2 to 5 with the brewing chamber in the closed position and a capsule ready for brewing;

FIG. 7 shows a transverse cross-section according to line VII-VII in FIG. 6;

FIG. 8 shows a transverse cross-section according to line VIII-VIII in FIG. 7;

FIG. 9 shows a longitudinal cross-section of the brewing unit according to FIGS. 2 to 8, before a washing or de-scaling cycle;

FIG. 14 shows a perspective view similar to FIG. 12 with the brewing unit in a closed position;

FIG. 15 shows a section of the brewing unit in a closed position;

FIGS. 16 and 17 show axonometric views of a coffee machine according to a different embodiment of the invention, in an open and closed position respectively, with some parts of the outer housing being removed;

FIGS. 18, 19 and 20 show sections of the machine of FIGS. 16 and 17 in three different operative conditions;

FIGS. 18A and 20A show cross sections along lines XVIII-XVIII and XX-XX in FIGS. 18 and 20 respectively;

FIGS. 21A-23C show details of one embodiment of a capsule ejection system of the machine illustrated in FIGS. 16 to 20A, in different positions.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Hereinafter reference will specifically be made to brewing units using pre-packaged capsules for the preparation of coffee beverages. However it should be understood that the invention can be embodied also in brewing units using loose ingredients, such as coffee powder, as well as to units for the preparation of different kinds of beverages suitable for human consumption by means of extraction with hot pressurized water. A beverage is to be understood broadly as including a substantially liquid edible product.

Figure 1:
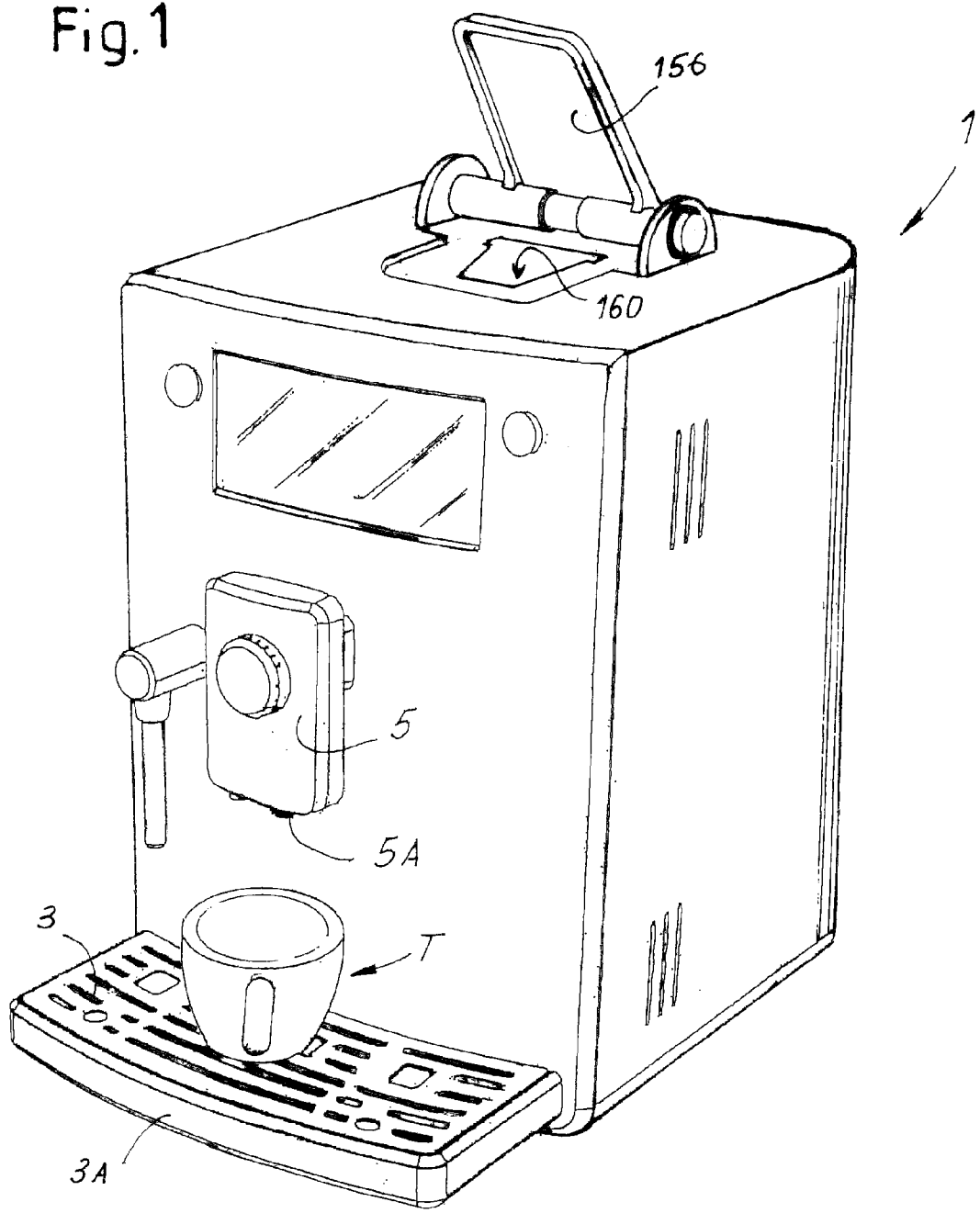
FIG. 1 shows a perspective view of a coffee machine including a brewing unit according to the invention.

FIG. 1 shows generically a manually operated coffee machine for use with capsules, including a brewing unit, which will be described hereinafter referring to FIGS. 2 to 15. The machine 1 comprises a grid 3 on which one or two cups T can be placed, under a coffee spout 5 provided with two nozzles 5A from which the drink produced by the brewing unit 2 is supplied. A drip tray 3A is arranged under the grid 3.

Embodiment of FIGS. 2-11

A brewing unit according to a first embodiment of the invention is shown in FIGS. 2-11. The brewing unit is designated 202 as a whole and can be arranged in a coffee machine such as the one diagrammatically shown in FIG. 1.

Figure 2:
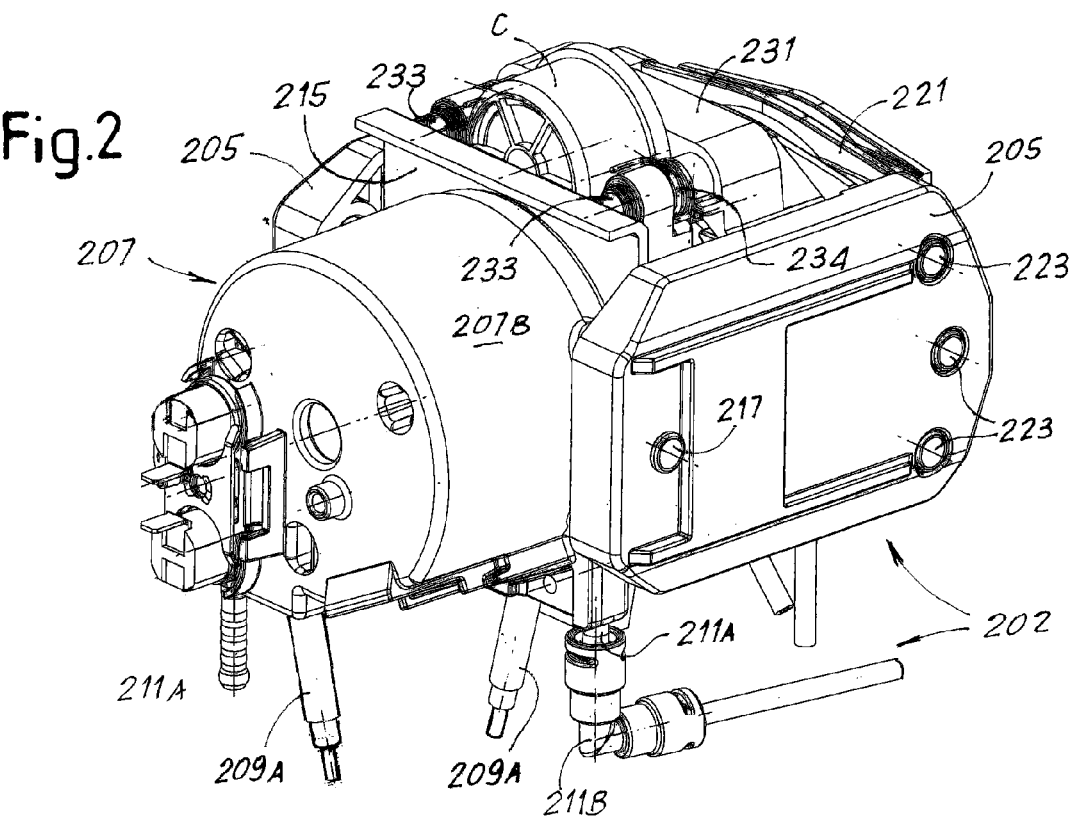
FIG. 2 shows a perspective view of a brewing unit according to the invention in a second embodiment.
Figure 3:
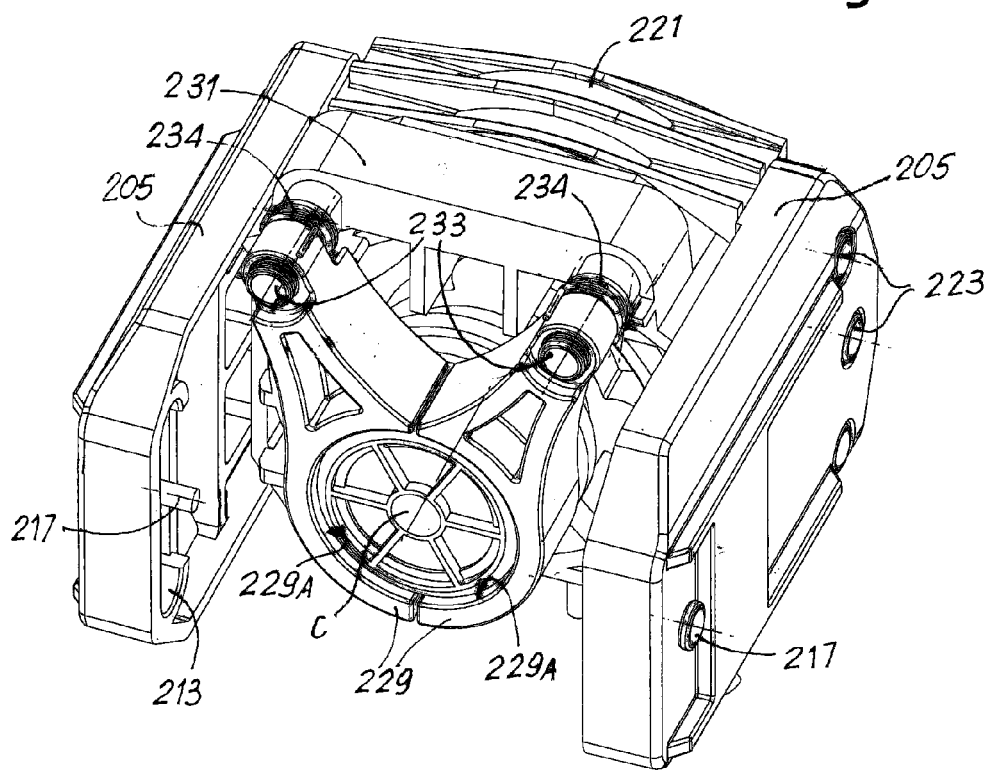
FIG. 3 shows a perspective view of the brewing unit of FIG. 2 with the water heater removed.
Figure 10:
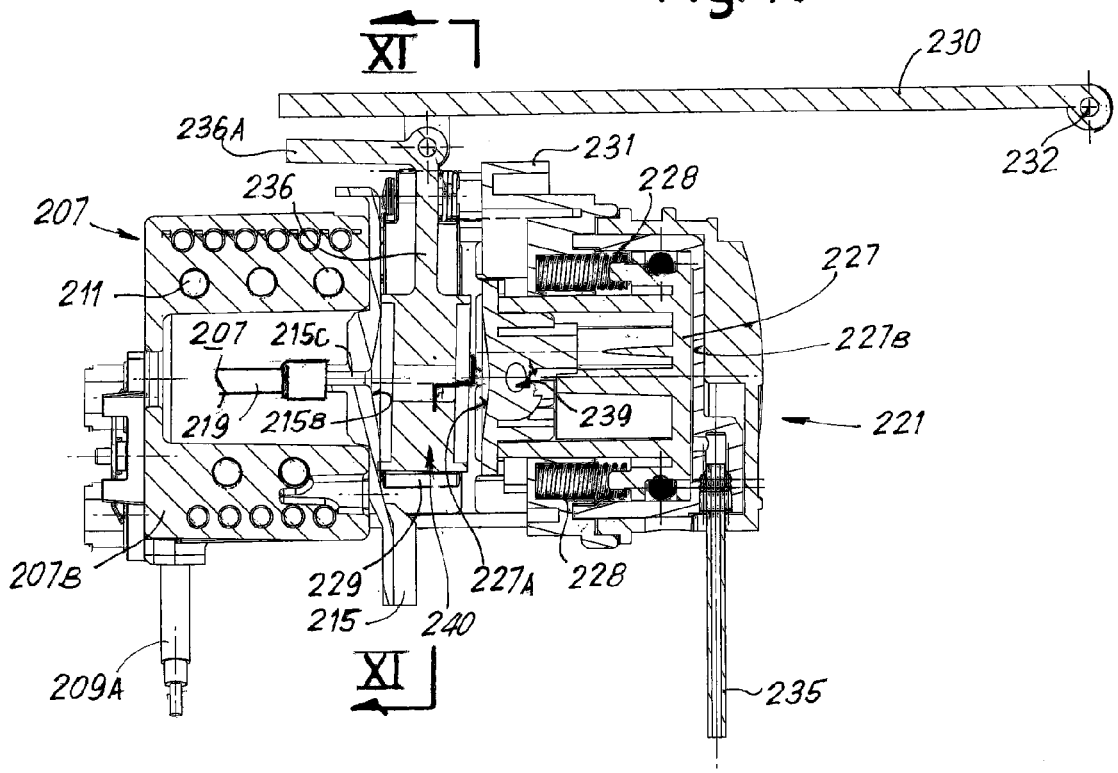
FIG. 10 shows a longitudinal cross-section of the brewing unit according to FIGS. 2 to 9 during a washing or de-scaling cycle.
Figure 11:
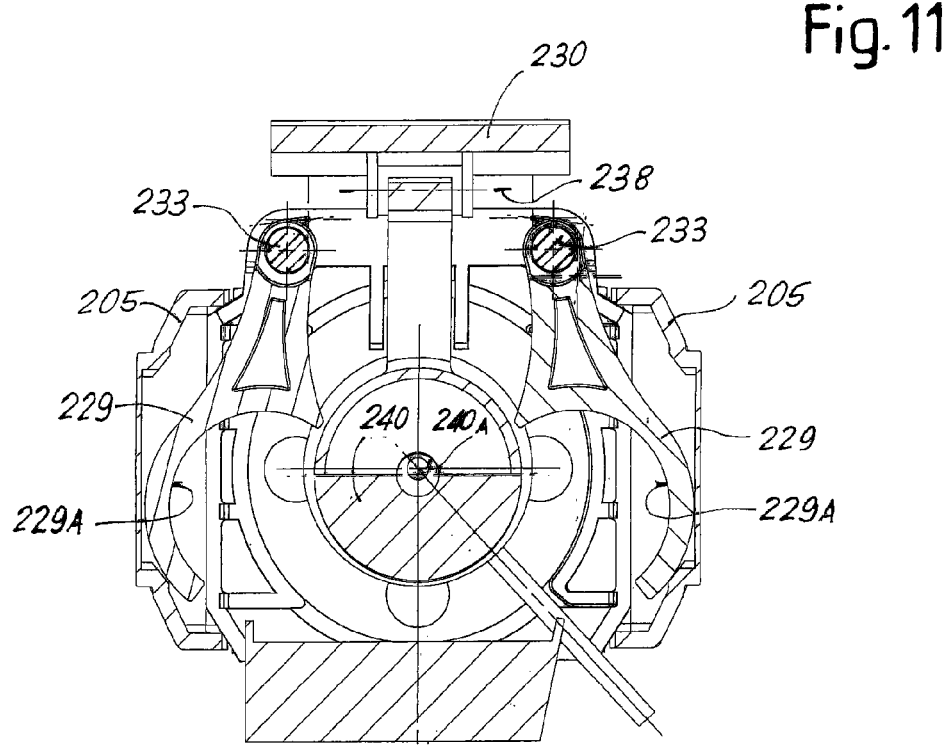
FIG. 11 shows a transverse cross-section according to line XI-XI in FIG. 10.

Referring e.g. to FIGS. 2 to 4, the brewing chamber is housed between two side panels 205 connected to one another to form a closed structural frame which supports the forces generated by the pressurized brewing water during the brewing cycle. At one end the side panels 205 are connected to one another by a water heater 207.

In some embodiments the water heater 207 is preferably an instant or flow-through water heater. The water heater 207 can comprise (see in particular FIG. 5) a main body 207B made for example of aluminium, an aluminium alloy or another suitable, heat-conductive material. The main body 207B houses a preferably helically wound electric resistor 209 provided with connectors 209A for connection to a power source, not shown. Within the main body 207B a preferably helically wound water heating duct 211 is also arranged, through which the brewing water is pumped. A water inlet is shown at 211A. The main body 207B has an inner cavity 207C extending along the entire body 207B of the water heater and through which a coffee dispensing duct extends, as will be described later on.

On the outer surface the main body 207B of the water heater 207 is provided with two opposite projections 207D extending orthogonally to the axis of the main body 207B. The two projections 207D can be integrally formed with the body 207B, e.g. by die casting. The two projections 207B form engagement members for connecting the water heater 207 to the two plates 205. The projections 207B can be constrained in seats 213 formed in the side panels 205. A plate 215 can be connected to the side panels 205 by means of screws 217 engaging in threaded holes formed in protrusions 215A of said plate 215. In some embodiments, the plate 215 forms centrally a first portion of a brewing chamber shown at 215B. The central portion 215B of the plate 215 can be funnel-shaped and centrally provided with an exit hole 215C, from which the coffee beverage is dispensed into a beverage dispensing duct 219 extending through the cavity 207C of the water heater 207. The plate 215 is in mechanical contact with the main body 207B of the water heater 207, such that the water heater 207 is actually in thermal contact with the portion of the brewing chamber formed by said plate 215. Heat conduction from the main body 207B of the water heater 207 to the plate 215 keeps at least a portion of the brewing chamber at a temperature higher than ambient temperature.

Opposite the water heater 207 an opposing closure member is provided. In the embodiment shown, a hydraulic device 221 is provided. The hydraulic device 221 comprises an outer cylinder 225 engaged by means of said screws 223 to the side panels 205. Thus, the water heater 207, the cylinder 225 of the hydraulic device 221 and the side panels 205 form a structural frame encircling the brewing chamber.

The brewing chamber is formed by the central portion 215B of the plate 215, by a piston 227 forming part of the hydraulic device 221 and by pivoting brackets 229 pivotally engaged to a block 231 constrained to the hydraulic device 221. Pivot pins 233 connect the brackets 229 to the block 231. Helical springs 234 mounted around pivot pins 233 resiliently bias the two brackets 229 in a closed position. In said closed position the distal ends of the brackets 229, i.e. the ends opposite the pivot pins 233, abut one against the other.

The brackets 229 can have an arcuate shape and substantially cylindrical or frustum-conical inner surfaces 229A, the shape of which corresponds to the outer shape of the side wall of the capsule C. When the brackets 229 are in the closed position, the cylindrical or frustum-conical inner surfaces 229A thereof thus define a closed surface corresponding to the outer side surface of the capsule C.

The piston 227 is provided with a closure surface 227A facing the plate 215 and designed to press against the top surface of a capsule C. The piston 227 is slidingly housed in the cylinder and is pushed by compression springs 228 against the bottom of the cylinder 225. A pressurized fluid chamber is thus formed between the bottom of the cylinder 225 and the surface 227B of the piston 227 opposite surface 227A.

In order to close the brewing chamber a pressurized fluid flows through a duct 235 in the pressurized fluid chamber defined by the inner surface of the cylinder 225 and the surface 227B of the piston 227. The pressurized fluid biases the piston 227 against the action of the springs 228 such as to press the surface 227A against the top surface of a capsule C. The pressurized fluid can be cold water fed by the same pump which feeds pressurized water to the water heater 207 or a different pump.

Hot water dispensed by the water heater 207 flows through duct 237 into a hot water chamber 239 (see in particular FIGS. 7 and 8) formed in the piston 227. A port connects the hot water chamber 239 to a plenum 241 which is in turn in fluid connection with a duct 243 ending on the surface 227A of the piston 227. A calibrated valve 245 closes the port between the chamber 239 and the plenum 241 until the pressure in the hot water chamber 239 has reached a pre-set value, for example in the range of 8-20 bar.

The operation of the brewing unit 202 is clearly shown in the sequence of FIGS. 5 and 6. When the hydraulic device 221 is open (FIG. 5), i.e. the piston 227 is entirely retracted in the cylinder 225 under the effect of the springs 228, a capsule C can be introduced in the brewing unit 202. In some embodiments, a spent capsule CO used in the previous brewing cycle is still retained between the brackets 229 (see FIG. 5). The new capsule C is therefore pushed between the brackets 229 from above and forces the brackets 229 to open against the action of the springs 234. The spent capsule CO retained between the brackets 229 is therefore released and falls down by gravity into a collecting tray, not shown. The new capsule is C pushed between the brackets 229 which close around the new capsule due to the force applied by the springs 234.

In some embodiments, as shown in FIGS. 5 to 11, the new capsule C is pushed between the brackets 229 by means of a pivoting arm 230 hinged at 232 to a fixed structure of the machine, not shown, when the two brewing chamber portions 215B and 227 are spaced apart from one another. The pivoting arm 230 carries a lever 236 hinged at 238 to arm 230. The lever 236 in turn comprises two portions 236A, 236B oriented at approximately 90° one to the other. The portion 236A forms a pusher which pushes the capsule C between the brackets 229. The portion 236B carries a dummy capsule 240 for the purposes, which will be explained later on.

Once the capsule C has been positioned between the brackets 229 and is therefore located between the two distanced brewing chamber portions 215B and 227, pressurized water is fed through duct 235 to move the two distanced brewing chamber portions towards one another by forcing the piston 227 against the capsule C until the front surface 227A of the piston 227 sealingly engages the top surface of the capsule C. The thrust exerted by the piston 227 also causes the capsule C to press with the bottom surface thereof against the plate 215, thus sealingly engaging the capsule there against. A brewing chamber is therefore formed by surface 227A of piston 227, brackets 229 and plate 215. In some embodiments the cylindrical or frustum-conical side wall of capsule C is sufficiently strong to resist the inner pressure generated by the water, such that no special measures are required to keep the brackets 229 in the closed position. In other embodiments, the piston 227 can be provided with locking pins or similar locking devices which engage with the brackets 229 such that any side swelling of the capsule C due to inner pressure is prevented by the brackets 229 being locked in their closed position by said locking pins.

Once the brewing chamber is closed, as shown in FIG. 6, hot pressurized water flows from the water heater 207 through duct 237 in chamber 239. Once the pressure reaches the opening pressure of valve 245, the latter opens and the pressurized hot water flows into and through the capsule C. The pressurized hot water extracts the flavours from the ingredients (e.g. coffee powder) contained in the capsule and the beverage thus produced exits the brewing chamber through hole 215C and duct 219. The latter is connected to a beverage dispensing spout (not shown) from which the beverage is dispensed in a container.

The pushing force exerted by the pressurized water during brewing on the opposing surfaces 227A of piston 227 and 215B of plate 215 is discharged on the structural frame formed by the water heater 207, the side panels 205 and the cylinder 225 of hydraulic device 221.

The water heater 207 is arranged close to the brewing chamber such that the length of the hot water dispensing duct from the water heater 207 to the brewing chamber is reduced, thus minimising on the one side the heat losses and on the other the amount of water between the water heater and the brewing chamber which reduces the temperature of the beverage dispensed during the first brewing cycle after a period of standby of the brewing unit.

In this embodiment, moreover, the beverage dispensing duct 219 from which the beverage is dispensed extends through the empty cavity 207C of the water heater 207, such that the temperature of the beverage is maintained or at least temperature reduction is limited to a minimum, thus obtaining a hotter beverage at the dispensing spout of the machine. Moreover, when the water heater 207 is turned on, the beverage dispensing duct 219 is maintained at a temperature above ambient temperature even before a first brewing cycle is performed following turning on of the coffee machine in which the brewing unit is arranged, or following a prolonged standby interval. Thus, also the first beverage dispensed by the brewing unit is relatively hot.

The embodiment shown in FIGS. 2 to 11 is designed for use in combination with capsules having permeable top and bottom surfaces, such that no perforation means are required. In some other embodiments, not shown, a perforator for the top or the bottom surface of the capsule, or for both surfaces can be provided.

As mentioned above, moreover, the embodiment of FIGS. 2-11 is provided with a dummy capsule 240 carried by the pivoting arm 230. A dummy capsule is a body having a shape approximating the shape of the capsule C, provided with a through hole 240A (FIGS. 5-11). The dummy capsule can also be provided with two opposite impressions 240B surrounded by annular ridges 240C. During a normal brewing cycle (FIGS. 5, 6) the dummy capsule 240 is kept in a cleared position, folded against the lower surface of the pivoting arm 230, such that it does not interfere with the brewing unit 202.

When the brewing unit must undergo a washing or de-scaling cycle, water or a washing medium must circulate through the hydraulic circuit of the machine, including the water heater 207, the brewing chamber and the coffee dispensing duct 219. Since the brewing chamber is not sealed, any fluid used during a washing or de-scaling cycle would drip out and would not properly flow through the circuit up to the beverage dispensing spout. By interposing the dummy capsule 240 between the surface 227A of piston 227 and the plate 215 and by pushing the piston 227 against the dummy capsule 240, a sealed hydraulic circuit is formed between the piston 227 and the beverage dispensing spout, such that water or a washing medium can correctly flow therethrough. The dummy capsule 240 is slightly larger in diameter than a normal capsule C, such that once it is pushed between the brackets 229, the latter are kept spread apart (see in particular FIG. 11) and the dummy capsule 240 can easily be recovered by simply lifting the pivoting arm 230.

By supporting the dummy capsule 240 on the pivoting arm 230, loss of the dummy capsule is prevented. Also, after a washing or de-scaling cycle has been completed, the dummy capsule is retracted from the brewing unit 202 and does not fall in the exhausted-capsule tray underneath the brewing unit.

A dummy capsule as described above can be used in any brewing unit provided with an arm or a lever arranged for pushing capsules into the brewing unit.

Thus, according to a further aspect, the invention also concerns a brewing unit for the production of beverages including a brewing chamber, means for opening and closing the brewing chamber, a movable unit, such as a pivoting arm or lever, for pushing a capsule into the brewing unit, wherein said movable unit supports a dummy capsule. Advantageously, the dummy capsule is movably supported on said movable unit, such that it can take an active position or an inactive position with respect to the movable unit. In the inactive position, the dummy capsule does not interfere with the brewing unit. In the active position the dummy capsule enters the brewing unit in replacement for a normal capsule. In preferred embodiments the dummy capsule is supported by a pivoting arm having two portions forming an angle therebetween, such as a 90° angle. One portion forms a capsule pusher for pushing normal capsules in the brewing unit. The other portion is integral with the dummy capsule.

Embodiment of FIGS. 12-15

Figure 12:
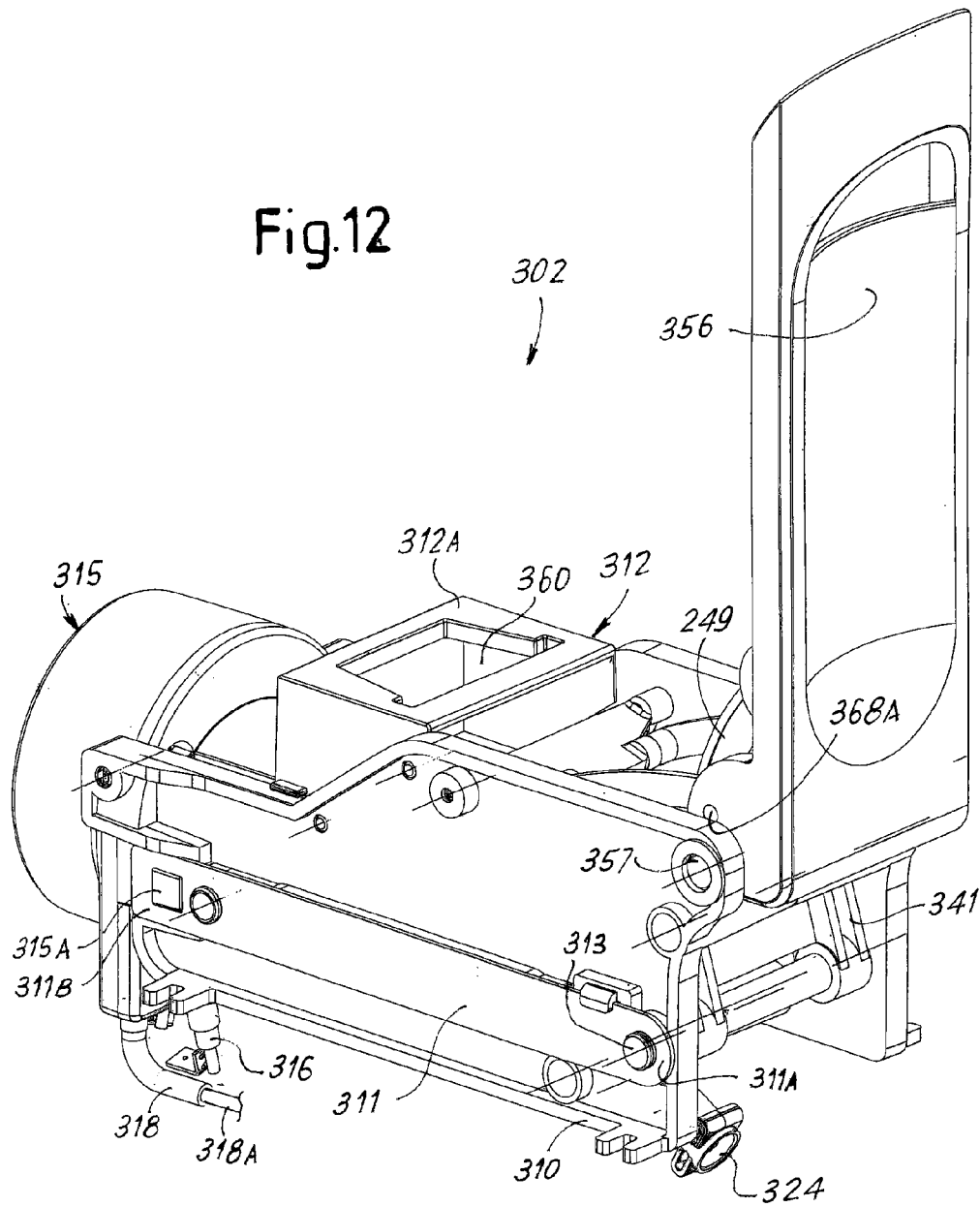
FIG. 12 shows a perspective view of a brewing unit according to a further embodiment.

FIGS. 12- to 15 show a further embodiment of a brewing unit according to the invention.

The brewing unit, labelled 302 as a whole, comprises a fixed shell 310 and a block 312 arranged on top of said fixed shell 310 and constrained thereto. The fixed shell 310 and the block 312 are mounted in a fixed position inside a coffee machine, such as coffee machine 1 in FIG. 1. The shell 310 encloses two portions of a brewing chamber and houses a structural frame which surrounds the brewing chamber and on which the forces generated inside the brewing chamber during the brewing process are discharged.

In some embodiments the structural frame includes two lateral tie rods 311. Each tie rod 311 can be made of a metal sheet or any other suitable material.

First ends 311A of the two tie rods 311 are connected to one another by a transverse shaft 313. The opposite second ends 311B of the tie rods 311 are shaped such as to form a connector member for connection to a water heater 315. In some embodiments the ends 311B of the tie rods are provided with a through hole, to provide a mechanical connection to corresponding protrusions 315A provided on the outer surface of the water heater 315.

The two tie rods 311, the shaft 313 and the water heater 315 are structurally connected to form said structural frame which receives the forces generated in the brewing chamber during brewing. The water heater 315 forms therefore a structural component of said frame. In other embodiments, not shown, a different arrangement can be provided, where the water heater does not form part of the structural frame and/or the structural frame can be dispensed with and replaced by different means to withstand the pressure forces generated in the brewing chamber.

In some embodiments the water heater 315 comprises a main body 315B, e.g. formed by a block made of metal, such as aluminium or an aluminium-based alloy, or other heat-conductive material. The protrusions 315A are preferably formed on the outer side surface of the main body 315B. The main body 315B can be made by pressure die-casting. The protrusions 315A can be formed integrally with the main body 315B in a single die-casting manufacturing step.

In some embodiments, in the main body 315B an electric resistor 315C and a water heating duct 315D are enclosed. Both the electric resistor 315C and the water heating duct 315D can be helically wound around an axis of the body 315B of the water heater 315. The connectors of the electric resistor 315D to a power line are labelled 316. The input end of the water heating duct 315D is connected via a connecting pipe to a water pump (not shown). The output end of the water heating duct 315D has a connector 318 from which hot pressurized water is fed to the brewing chamber, as will be disclosed later on.

Such a water heater is a so-called instant or flow-through water heater, i.e. one in which a very small amount of water is contained in the helically shaped water heating duct 315D and wherein the electric resistor 315C is sufficiently powerful to heat the water while it is fed through the water heater 115 during use.

In some embodiments the brewing chamber comprises two portions. In the embodiment shown in FIGS. 12-15 the brewing chamber includes a first brewing chamber portion 321 and a second brewing chamber portion 323. In some embodiments the first brewing chamber portion 321 is mounted fixed with respect to the frame including the tie rods 311, the shaft 313 and the water heater 315. Preferably the first brewing chamber portion 321 is in heat-contact with the body of the water heater 315, for example attached to or supported by the water heater 315.

In the embodiment shown in FIGS. 12-15 the first brewing chamber portion 321 is housed in a seat 322 rigidly constrained to the body of the water heater 315. The seat 322 can be formed integrally with the body 315B of the water heater 315, e.g. it can be manufactured with the remaining part of the body 315B and with the protrusions 315A in a single moulding or die casting manufacturing step. The water heater 315 is thus in heat contact with the brewing chamber portion 321 through said seat 322. Heat contact means that heat can be transmitted from the main body 315B of the water heater 315 to the brewing chamber portion 321 by conduction, such that the water heater 315 can keep the brewing chamber portion 321 at a temperature above ambient temperature due to heat conduction.

The second brewing chamber portion 323 is movable with respect to the first brewing chamber portion 321 according to the double arrow f323 along a direction substantially parallel to the axis A-A of the brewing chamber.

One or both said brewing chamber portions can be provided with perforation means to perforate a capsule C containing the ingredients for producing the coffee beverage or any other edible product by infusion.

In the embodiment shown in the drawings the movable brewing chamber portion 323 is provided with perforators 325 extending through holes provided in a disc member 327 slidably arranged in the movable brewing chamber portion 323. The disc member 327 is provided with a sealing ring 329 co-acting with an annular edge of the opposite fixed brewing chamber portion 321. When the brewing chamber is closed and the brewing cycle starts, hot water flowing from the water heater 315 and exiting the connector 318 enters the brewing chamber through a duct 324 from the side of the movable brewing chamber portion 323. A flexible pipe 318A connects the duct 324 and the connector 318, allowing the closing and opening movement of the two brewing chamber portions. The pressurized hot water flows through the holes provided in the disk member 327 and enters the capsule C through apertures punched in the top surface of the capsule by the perforators 325.

Springs (not shown) push the disc member 327 away from the bottom of the housing formed by the outer substantially cylindrical wall of the movable brewing chamber portion 323, such as to remove the capsule C from the perforators 325 after brewing has taken place.

The fixed brewing chamber portion 321 is cup-shaped and near the bottom thereof a plate 331 is arranged, which is provided with perforating protrusions 333. The protrusions 333 are apertured such that the beverage extracted from the ingredients contained in the brewing chamber exits the brewing chamber through passages extending along the protrusions 333 and is dispensed through a beverage dispensing duct 334.

A substantially cylindrical hollow member 335 can be housed inside the brewing recess of the movable chamber portion 323. The cylindrical hollow member 335 can be provided with an inner wall 335A having a shape reproducing the shape of the outer side surface of the capsule C, in the illustrated example an approximately frustum-conical shape. The hollow member 335 is elastically biased by a spring 337 arranged between the cylindrical hollow member 335 and the bottom of the fixed brewing chamber portion 321. Said cylindrical hollow member 335 acts as an ejector to eject the capsule C from the inside of the fixed brewing chamber portion 323 after brewing.

The beverage dispensing duct 334, from which the beverage is dispensed extends across the body 315B of the water heater 315. For that purpose, the body 315B of the water heater 315 is axially hollow as shown at 315E and has a front through hole 315F, the hollow 315E and the through hole 315F forming an inner cavity extending through the whole body of the water heater across which the beverage dispensing duct 334 can extend and be connected to the beverage dispensing spout 5, 5A of the machine.

This special arrangement ensures that the beverage dispensing duct 334 is heated up and is brought at an above-ambient temperature even before the first brewing cycle is performed. Heating of the beverage dispensing duct 334 is achieved by heat convection from the water heater 315. The intimate contact between the fixed brewing chamber portion 321 and the body 315B of the water heater 315 is such that the larger one of the two brewing chambers is heated by the same resistor which heats the brewing water before the brewing cycle starts. Both measures result in a hot beverage being dispensed already from the very first beverage portion dispensed by the brewing unit 302.

The use of two perforators to perforate the bottom surface and the top surface of a capsule C is not mandatory. However providing two perforators allows the use of sealed capsules, made of plastic, metallic sheet or other suitable material. The possibility of omitting one or the other, or both perforators, is not excluded, for example when capsules are used, which open by the effect of the water pressure outside and/or of the drink pressure inside the capsule or when capsules are used which have one or both opposed faces provided with a water-permeable area, for example closed with a non woven cloth or a filter made of paper or other permeable material.

While the fixed brewing chamber portion 321 is fixedly supported on the water heater 315, the movable brewing chamber portion 323 is slidingly supported within the frame formed by the water heater 315, the tie rods 311 and the shaft 313. More specifically, the movable portion 323 of the brewing chamber can be provided with pairs of laterally projecting pins 323A which are slidingly engaged into slots 310A of the outer shell 310. The pins 323A have an elongated cross-section such that a pair of such pins is sufficient to conveniently guide the movable brewing chamber portion 323 avoiding tilting thereof.

The movement of the movable brewing chamber portion 323 is controlled by a crank 341 hinged about the shaft 313 and pivoted at 343 to a corresponding pair of rods 347. The rods are in turn hinged at 348 to the movable brewing chamber portion 323. The movement of the brewing chamber portion 323 can be controlled by means of a tie rod 349 hinged at 343 at the pivot which connects the crank 341 and the rods 347. The tie rod 349 is in turn pivoted at 350 to a control lever 356 pivotally engaged at 357 to the shell 310.

The rotation of the control lever 356 about the hinge 357 according to double arrow f356 causes the rotation of the crank 341 about the shaft 313. The rotary motion of the crank 341 is transformed by the crank-rod connection 341-347 into a translation motion of the movable brewing chamber portion 323.

Other kinds of actuating mechanisms can be used to control the closing and opening of the brewing chamber. For example an electric motor or a hydraulic or pneumatic actuator can be used, which acts for example on a shaft controlling the movement of the crank 341.

According to the embodiment shown in FIGS. 12 to 15 the capsule C is introduced into the brewing chamber by gravity. For that purpose, an aperture or slot 360 is provided on a top surface 312A of the block 312. The capsule C is caused to fall according to arrow F1 (FIG. 13) through the aperture or slot 360.

When the brewing chamber is in its open position (FIGS. 12, 13), a mobile deviating member 363 hinged by means of a pin 361 to the upper block 312 is arranged underneath said aperture 360. The pivoting pin 361 is preferably parallel to the shaft 313 and to the pivoting axes of the transmission members 356, 349, 347, 341 described above and orthogonal to the direction f323 of the closing and opening motion of the brewing chamber.

As explained in more detail hereinafter, the mobile deviator 363 aims at guiding and deviating a capsule C towards the inside of the fixed brewing chamber portion 321 and to favour the discharge, i.e. the ejection of the exhausted capsule C after brewing.

The rotation motion according to the double arrow f363 of the mobile deviator 363 around the pin 361 can be imparted preferably by the lever 356. In the illustrated embodiment, this motion is obtained by means of a connecting member between the control lever 356 and the mobile deviator 363. The connection member can comprise a pair of connection rods 368 pivoted at 368A to the control lever 356 and at 368B to an appendage 363A of the mobile deviator 363. The rotary movement of the control lever 356 causes therefore also a pivoting movement of the mobile deviator 363. The latter can take up two end positions, shown in FIGS. 13 and 15 respectively, corresponding to the open position and closed position of the brewing chamber, respectively.

In the first position, the mobile deviator 363 is arranged under the aperture or slot 360 such that the capsule C introduced through the slot 360 is deviated by the mobile deviator 363 towards the fixed portion 321 of the brewing chamber. In the second position (FIG. 15) the mobile deviator 363 is placed above the brewing chamber. The movement of the mobile deviator 363 controlled by lever 356 is phased such that mobile deviator is moved away from the path of the movable brewing chamber portion 323 in advance of the closure of the brewing chamber, such as not to interfere with the closing movement.

Figure 13:
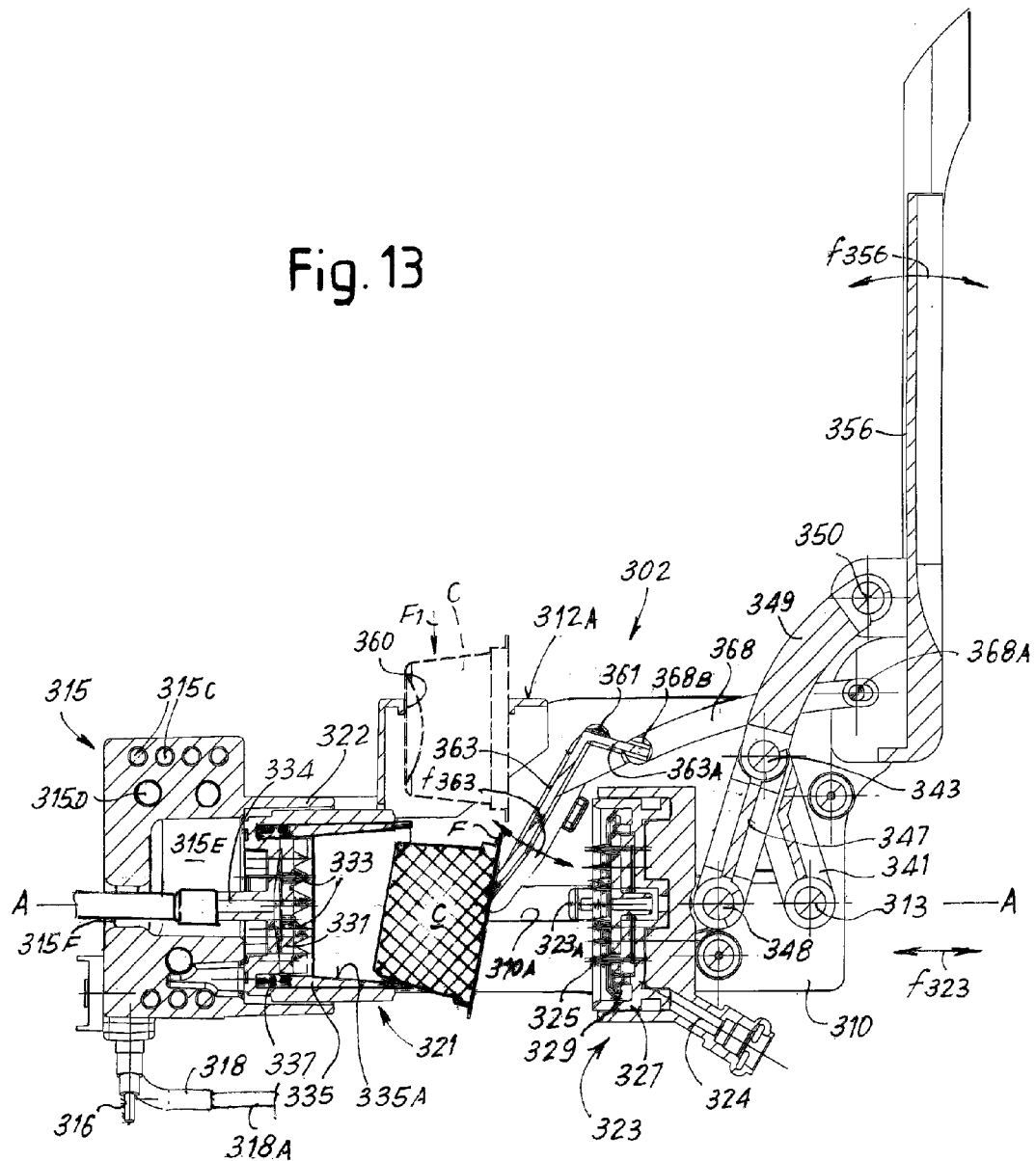
FIG. 13 shows a section of the brewing unit of FIG. 12 according to a vertical longitudinal plane.

The operation of the brewing unit 302 described so far is as follows. In FIGS. 12 and 13 the brewing unit 302 is open. The aperture 360 is accessible for the introduction of a capsule C in the brewing unit. The capsule C falls by gravity into the brewing unit 102, reaching the position shown in solid line in the cross section of FIG. 13. During its falling movement the capsule C meets the chute mobile deviator 363 and is stopped thereby. The mobile deviator 363 is in a position such that the capsule C, by meeting the mobile deviator 363, is deviated with the bottom thereof towards the brewing recess formed in the interior of the fixed brewing chamber portion 321. The capsule C is retained in this position until the brewing unit is closed acting on the control lever 356, resting with the top surface against the mobile deviator 363 and with the side surface against the edge of the fixed brewing chamber portion 321.

By actuating the control lever 156 downwards, the brewing chamber is closed (FIGS. 14, 15). During the closing motion the mobile deviator 363 is gradually lifted and clears the area where the mobile brewing chamber portion 323 moves approaching the fixed brewing chamber portion 321. The lifting pivoting motion around the pin 361 is controlled by the control lever 356 via rods 368.

In the closed position the flange F of the capsule C is sealingly engaged between the edge of the fixed brewing chamber portion 323 and the seal 329 of the mobile brewing chamber portion 323. The projections of the perforators 325 and 333 penetrate respectively in the front surface and in the bottom surface of the capsule C allowing hot pressurized water to flow through the capsule and the ingredients contained therein to extract the flavours for the production of the beverage.

Once the brewing cycle has ended, with a reverse rotary motion of the control lever 356 the brewing chamber 321, 323 is opened again. The mobile deviator 363 is pushed downwards by the arms 368 such as to push against i the capsule C. The latter is ejected or at least partially taken off from the recess of the fixed brewing chamber portion 321 by the elastic thrust exerted by the springs 337 on the hollow member 335, thus preventing the capsule C from remaining inside the fixed brewing chamber portion 321. The push exerted on the upper side on the capsule C by the mobile deviator 363 avoids that the capsule C can remain adhering to the mobile brewing chamber portion 323. The exhausted capsule C is thus reliably discharged by gravity.

Embodiments of FIGS. 16 to 23

A further embodiment of the invention is shown in FIGS. 16 to 20.

FIGS. 16 and 17 show two axonometric views of the machine with parts of the outer housing removed in order to show inner components of the brewing unit. In FIG. 16 the machine is in the open position, i.e. with the brewing chamber open and ready to receive a capsule. In FIG. 17 the machine is in the closed position, i.e. with the brewing unit chamber closed to perform a brewing cycle.

The machine is indicated 401. A brewing unit 402 including a water heater 403 is placed in the upper part of the machine 401 and is covered by an upper portion 401A of the housing (removed in FIGS. 16 and 17) and by a frontally arranged slidable cover 404, also removed in FIGS. 16 and 17 and shown in FIGS. 18-20. A coffee dispensing spout 405 is provided in the front part of the machine, above a drip tray 407 connected to the lower part 401B of the machine housing.

In some embodiments the water heater 403 is an instant, i.e. a flow-through water heater, comprising a main body 403B, e.g. formed by a block made of metal, such as aluminium or an aluminium-based alloy, or other heat-conductive material. In the main body 403B an electric resistor 411 and a water heating duct 413 are enclosed. Both the electric resistor 411 and the water heating duct 413 can be helically wound around an axis of the body 403B of the water heater 403. The input end of the water heating duct 413 is connected via a connecting pipe to a water pump (not shown). The output some embodiments the brewing chamber comprises two portions. In the embodiment shown in FIGS. 16-20 the brewing chamber includes a first brewing chamber portion 421 and a second brewing chamber portion 423. In this embodiment the first brewing chamber portion 421 is mounted in a cavity 403C provided inside the block forming the body 403B of the water heater 403. Preferably the brewing chamber portion 421 and the water heater 403 are fixed one with respect to the other and in mutual thermal contact. In thermal contact means that heat can be transmitted from the main body 403B of the water heater 403 to the brewing chamber portion 421 by conduction, such that the water heater 403 can keep the brewing chamber portion 421 at a temperature above ambient temperature due to heat conduction.

As will be explained later on, the water heater 403 is movable along with the chamber portion 421 with respect to the housing of the coffee machine 401 according to double arrow f421, along a direction substantially parallel to the axis A-A of the brewing chamber, in order to close and open the brewing chamber. In this embodiment, also the second brewing chamber portion 423 is movable with respect to the first brewing chamber portion 421 and with respect to the housing of the coffee machine 401 according to the double arrow f423 along a direction substantially parallel to the axis A-A of the brewing chamber.

One or both said brewing chamber portions 421, 423 can be provided with perforation means to perforate a capsule C containing the ingredients for producing the coffee beverage or any other edible product by infusion.

In the embodiment shown in the drawings the brewing chamber portion 423 is provided with perforators 425 extending through holes provided in a disc member 427 slidably arranged in the movable brewing chamber portion 423. The disc member 427 is provided with a seal 429 co-acting with an annular edge of the opposite brewing chamber portion 421. When the brewing chamber is closed and the brewing cycle starts, hot water flowing from the water heater 403 and exiting the connector 415 enters the brewing chamber through a duct 424 provided in the brewing chamber portion 423. The pressurized hot water flows through the holes provided in the disk member 427 and enters the capsule C through apertures punched in the top surface of the capsule by the perforators 425.

Springs (not shown) push the disc member 427 away from the bottom of the housing formed by the outer substantially cylindrical wall of the brewing chamber portion 423, such as to remove the capsule C from the perforators 425 after brewing has taken place.

The brewing chamber portion 421 is cup-shaped and near the bottom thereof a plate 431 is arranged, which is provided with perforating protrusions 433. The protrusions 433 are apertured such that the beverage extracted from the ingredients contained in the brewing chamber exits the brewing chamber through passages extending along the protrusions 433 and is dispensed through a beverage dispensing duct 434 in fluid communication with the dispensing spout 405.

A substantially cylindrical hollow member 435 can be housed inside the brewing recess of the chamber portion 423. The cylindrical hollow member 435 can be provided with an inner wall 435A having a shape reproducing the shape of the outer side surface of the capsule C, in the illustrated example an approximately frustum-conical shape. The hollow member 435 is elastically biased by a spring 437 arranged between the cylindrical hollow member 435 and the bottom of the fixed brewing chamber portion 421. Said cylindrical hollow member 435 acts as an ejector to eject the capsule C from the inside of the fixed brewing chamber portion 423 after brewing.

The beverage dispensing duct 434, from which the beverage is dispensed extends along the inner cavity 403C provided in the body 403B of the water heater 403 up to the dispensing spout 405.

This special arrangement ensures that the beverage dispensing duct 434 is heated up and is brought at an above-ambient temperature even before the first brewing cycle is performed. Heating of the beverage dispensing duct 434 is achieved by heat convection from the water heater 403. The intimate contact between the brewing chamber portion 421 and the body 403B of the water heater 403 is such that the larger one (421) of the two brewing chamber portions 421, 423 is heated by the same resistor which heats the brewing water before the brewing cycle starts. Both measures result in a hot beverage being dispensed already from the very first beverage portion dispensed by the brewing machine 401.

According to the embodiment shown in FIGS. 16 to 20 the capsule C is introduced into the brewing chamber by gravity. For that purpose, an aperture or slot 460 is provided on a top surface 462 of the machine housing. The capsule C is caused to fall according to arrow F1 (FIG. 18) through the aperture or slot 460. The capsule is guided along downwardly extending channels 464 in which the annular flange Fc of the capsule engages. At the lower end of each channel 464 a capsule retention member 466 is arranged. The distance between the two opposing capsule retention members 466 is normally less than the outer diameter of the capsule flange Fc, such that a new capsule introduced in channels 464 reach its final position shown in FIGS. 18, 18A and in said position it will rest with the flange Fc against said capsule retention members 466 as shown in FIG. 18A. This is the final brewing position. The capsule will remain in this position during the brewing cycle. The brewing chamber is closed by moving the two brewing chamber portions 421, 423 towards the capsule.

The closing movement of the brewing chamber portions 421, 423 can be controlled in various ways, e.g. with electric or hydraulic actuators. According to one embodiment, shown in the figures, a simple hand-operated mechanical arrangement can be used for this purpose. The arrangement includes a control lever 467 which is hinged around a rotation axis X-X fixed with respect to the housing of the coffee machine. The rotation of the control lever 467 causes rotation of a pair of double cranks 469 around pivots 469A coaxial to the rotation axis X-X. The two double cranks 469 are hinged at one end (469B) to a pair of slotted L-shaped rocker arms 471, each of which is provided with a curved slot 471A. A transverse pin 471B rigidly connected to the brewing chamber portion 423 has opposite ends which are slidingly engaged into the curved slots 471A. Rotation of the control lever 467 around the axis X-X causes therefore a translation movement according to arrow f423 of the brewing chamber portion 423.

The brewing chamber portion 421 is mechanically connected to opposite ends of the two double cranks 469 by means of a pair of rocker arms 473 hinged to the respective double crank 469. Each rocker arm 473 is hinged at one end to a pivot pin 469C of the respective double crank 469 and at the opposite end to a pivot 475 rigidly constrained to the water heater 403.

With such arrangement, rotation of the control lever 467 causes a sliding movement according to double arrow f421 of the water heater 403 and of the brewing chamber portion 421 constrained thereto.

Thus, actuation of the control lever 467 causes the simultaneous movement of both brewing chamber portions 421 and 423 towards the capsule C and away therefrom, in order to close and open the brewing chamber.

The movement of the control lever 467 causes also actuation of means for ejecting the capsule C once the brewing cycle has been terminated, as disclosed here below.

A possible embodiment of a system for retaining a capsule before closure of the brewing chamber and ejecting the spent capsule is shown in FIGS. 21A-23C. These figures show the mechanism in isolation and with some parts removed for a clearer representation.

More specifically, FIGS. 21A, 21B and 21C show views from different points of observation of the mechanism in the position taken for receiving a fresh capsule when the brewing chamber is open. FIGS. 22A-22C show the same view of the mechanism in the position taken when the brewing chamber is closed. FIGS. 23A-23C show the same views of the mechanism in the position taken during opening of the brewing chamber after a brewing cycle has been completed.

In the exemplary embodiment shown in the drawings the two capsule retention members 466 are supported at opposite ends of an arched resilient member 468 which co-acts with the two double cranks 469. In FIGS. 21-23 only one of the two double cranks 469 is shown for the sake of clarity. Each double crank 469 is integral to a cam profile 470 coaxial to pivot 469A. Each cam profile 470 is slotted at 470A such as to be elastically deformable. Each cam profile 470 co-acts with a shaped profile 472 integral with the corresponding retention member 466.

In FIGS. 21A-21C each cam profile is arranged above the profile 472 of the corresponding capsule retention member 466. When the double cranks 469 are pivoted around the pivots 469A by turning the lever 467 around axis X-X, the two cam profiles 470 rotate around axis X-X until they achieve the position shown in FIGS. 22A-22C. This is made possible in that the cam profiles 470 are elastically deformable thanks to the slots 470A. The rotation movement from the open position (FIGS. 21A-21C9 to the closed position (22A-22C) of the brewing unit causes the cam profiles 470 to pass from a position above the profiles 472 to a position below said profiles 472 thanks to the deformation of the cam profiles 470, while the capsule retention members 466 and the arched resilient member 468 are prevented from being deformed due to the capsule arranged therein.

When the brewing chamber is opened after a brewing cycle has been completed, by acting on lever 467, the capsule retaining and ejecting mechanism moves from the position shown in FIGS. 22A-22C to the position shown in FIGS. 23A-23C. The cam profiles 470 co-act with the profiles 472 pushing them outwardly. This movement causes an elastic outward deformation of the opposite ends of the arched resilient member 468 to an extension sufficient to release the capsule C retained by the opposing retention members 466. The cam profiles 470 keep the resilient member 468 in the outwardly deformed condition until the two portions of the brewing chamber have been sufficiently distanced from one another, such that they do not retain the spent capsule C anymore. The latter will consequently fall by gravity into collection tray 480.

The invention claimed is:

1. A brewing unit for a production of a beverage, comprising:
   a brewing chamber comprising first and second brewing chamber portions movable one with respect to the other;
   a flow through water heater having an electric resistor and a water heating duct;
   a hot water feeding duct for feeding hot water from said water heater via the water heating duct to said brewing chamber; and
   a beverage dispensing duct from which said beverage is dispensed from the brewing chamber to an outer beverage dispensing spout;
   wherein said water heater has a body made of heat-conductive material and wherein the body of the water heater surrounds a cavity through which said beverage dispensing duct extends for connection to the outer beverage dispensing spout, and
   wherein said body encloses the electric resistor and the water heating duct, wherein heat generated by the electric resistor, when powered, heats water flowing through the water heating duct by heat conduction through the heat-conductive material forming the body.

2. The brewing unit according to claim 1, wherein at least one of said electric resistor and said water heating duct is wound around said cavity.

3. The brewing unit according to claim 1, wherein said first brewing chamber portion and said second brewing chamber portion are movable between an open position, in which said first and said second brewing chamber portions are distanced from one another for receiving an ingredient-containing package therebetween, and a closed brewing position.

4. The brewing unit according to claim 3, comprising a block having an aperture configured to insert the ingredient-containing package between said first brewing chamber portion and said second brewing chamber portion in said open position.

5. The brewing unit according to claim 1, wherein at least one of said first and said second brewing chamber portions is in thermal contact with said water heater.

6. The brewing unit according to claim 5, wherein said one of said first and said second brewing chamber portions in thermal contact with said water heater comprises a recess for a capsule.

7. The brewing unit according to claim 5, wherein said one of said first and said second brewing chamber portions in thermal contact with said water heater is at least partly arranged in a seat formed by said body of said water heater.

8. The brewing unit according to claim 7, wherein said seat is connected to said cavity extending along the body of said water heater.

9. The brewing unit according to claim 1, wherein both said first brewing chamber portion and said second brewing chamber portion are movable with respect to a capsule guide.

10. The brewing unit according to claim 9, wherein said first brewing chamber portion and said second brewing chamber portion are moved by a single control lever.

11. The brewing unit according to claim 9, comprising guiding channels for insertion of a capsule in a brewing position, and retention members to retain said capsule in said brewing position before and during closing of said brewing chamber.

12. The brewing unit according to claim 11, wherein said retention members are configured to disengage said capsule when said first and said second brewing chamber portions are moved apart to open the brewing chamber after completion of a brewing cycle.

13. The brewing unit according to 10, comprising guiding channels for insertion of a capsule in a brewing position, and retention members to retain said capsule in said brewing position before and during closing of said brewing chamber, wherein said single control lever controls cam profiles which act on said retention members to disengage said capsule from said retention members when the brewing chamber is opened by said single control lever.

14. The brewing unit according to claim 11, wherein said guiding channels are configured to receive the capsule by gravity.

15. The brewing unit according to claim 1, wherein said water heater is movable along with one of said first brewing chamber portion and said second brewing chamber portion during closing and opening of the brewing chamber.

16. The brewing unit according to claim 15, wherein said water heater and one of said first and brewing chamber portions movable with said water heater are housed in a slidable cover.

17. A beverage preparing machine including a brewing unit for a production of a beverage, the brewing unit comprising:
  a brewing chamber comprising first and second brewing chamber portions movable one with respect to the other;
  a flow through water heater having an electric resistor and a water heating duct;
  a hot water feeding duct for feeding hot water from said water heater via the water heating duct to said brewing chamber; and
  a beverage dispensing duct from which said beverage is dispensed from the brewing chamber to an outer beverage dispensing spout;
  wherein said water heater has a body made of heat-conductive material and wherein the body of the water heater surrounds a cavity through which said beverage dispensing duct extends for connection to the outer beverage dispensing spout, and
  wherein said body encloses the electric resistor and the water heating duct, wherein heat generated by the electric resistor, when powered, heats water flowing through the water heating duct by heat conduction through the heat-conductive material forming the body.

18. A brewing unit for a production of a beverage, comprising:
  a brewing chamber comprising at least two brewing chamber portions movable one with respect to the other;
  a heater having a water heating duct;
  a hot water feeding duct for providing hot water from said heater; and
  a beverage dispensing duct from which said beverage is dispensed from the brewing chamber to an outer beverage dispensing spout;
  wherein said heater has a body that surrounds a cavity through which said beverage dispensing duct extends for connection to the outer beverage dispensing spout.

* * * * *